United States Patent Office 3,652,588
Patented Mar. 28, 1972

3,652,588
6-ALKYL-1,2,3,4,5,6-HEXAHYDROAZEPINO-
[4,5-b]INDOLES
Jackson B. Hester, Jr., Kalamazoo, Mich., assignor to
The Upjohn Company, Kalamazoo, Mich.
No Drawing. Continuation-in-part of application Ser. No. 548,880, May 10, 1966. This application Oct. 23, 1969, Ser. No. 868,927
Int. Cl. C07d 27/54, 41/08
U.S. Cl. 260—326.3                      9 Claims

ABSTRACT OF THE DISCLOSURE

A 6-alkyl - 1,2,3,4,5,6 - hexahydroazepino[4,5-b]indole having a sedative tranquilizing and anorexigenic action of the formula:

wherein R and R′ are selected from the group consisting of hydrogen, alkoxy and alkyl containing from 1 to 3 carbon atoms, inclusive, and halogen; wherein $R_1$ is alkyl defined as above; and wherein $R_2$ is selected from the group consisting of hydrogen, methyl, ethyl, propyl, alkanoyl groups containing 1 to 3 carbon atoms, inclusive, benzyl and benzoyl, and the organic and inorganic acid addition salts of those compounds wherein $>N-R_2$ is an amino moiety, including pharmacologically acceptable acid addition salts of those compounds, are prepared. The compounds are used to tranquilize and sedate mammals or suppress hunger in mammals.

CROSS-REFERENCES TO RELATED APPLICATIONS

This application is a continuation-in-part of application Ser. No. 548,880, filed May 10, 1966, and now abandoned.

BACKGROUND OF THE INVENTION

The present invention is concerned with novel organic compounds, and, in particular, with 6-alkyl-1,2,3,4,5,6-hexahydroazepino[4,5-b]indoles, acid addition salts thereof, the intermediates thereof, and a process for the production therefor.

SUMMARY OF THE INVENTION

The novel compounds, the intermediates and the process of production therefor can be illustratively represented by the following sequence of formulae:

wherein R and R′ are selected from the group consisting of hydrogen, alkoxy and alkyl containing from 1 to 3 carbon atoms, inclusive, and halogen, with the proviso that at least one of the two ortho positions (to the hydrazino group) in compound I is hydrogen; wherein R″ is alkyl containing from 1 to 3 carbon atoms, inclusive; wherein R‴ is selected from the group consisting of hydrogen, methyl, ethyl and phenyl; and wherein R⁗ is selected from the group consisting of methyl, ethyl, propyl and benzyl.

In the above formulae the symbol $\phi$ refers to the phenyl group only.

The invention, therefore, embraces particularly compounds having the Formula XI:

wherein R and R′ are selected from the group consisting of hydrogen, alkoxy and alkyl containing from 1 to 3 carbon atoms, inclusive, and halogen; wherein $R_1$ is alkyl containing from 1 to 3 carbon atoms, inclusive; and wherein $R_2$ is selected from the group consisting of hydrogen, methyl, ethyl, propyl, alkanoyl groups containing 1 to 3 carbon atoms, inclusive, benzyl and benzoyl, and organic and inorganic acid addition salts of those compounds wherein $>N-R_2$ is an amino moiety.

The alkyl group as used in the above formulae containing from 1 to 3 carbon atoms, inclusive, comprises the members methyl, ethyl, propyl, and isopropyl; the alkoxy group comprises methoxy, ethoxy, propoxy, and isopropoxy; the alkanoyl group comprises formyl, acetyl and propionyl. The halogen atoms herein intended as substituents of the phenyl group are fluorine, chlorine and bromine.

The present invention also embraces the organic and inorganic acid addition salts of the novel amino compounds of Formula XI (i.e., compounds wherein $R_2$ is hydrogen, methyl, ethyl, propyl, or benzyl) such as the hydrochlorides, hydrobromides, hydroiodides, perchlorates, fluosilicates, thiocyanates, sulfates, cyclohexanesulfamates, acetates, propionates, laurates, palmitates, maleates, tartrates, lactates, citrates, oxalates, trifluoroacetates, trichloroacetates and the like.

The process of the present invention consists in: heating a phenylhydrazine of Formula I with 1-benzoylhexahydro-4H-azepin-4-one to obtain the corresponding phenylhydrazone of 1-benzoylhexahydro - 4H - azepin-4-one (II); heating II with formic acid to obtain the corresponding 3 - benzoyl-1,2,3,4,5,6-hexahydroazepino[4,5-b] indole (III); reducing III with a metal hydride, e.g., lithium aluminum hydride, to obtain the corresponding 3 - benzyl - 1,2,3,4,5,6 - hexahydroazepino[4,5-b]indole (IV); hydrogenolyzing IV in the presence of a palladium catalyst to give the corresponding 1,2,3,4,5,6-hexahydroazepino[4,5-b]indole (V); acylating the compound V with an acid anhydride, or if a 3-formyl product is desired, with a mixture of formic acid and acetic anhydride, to obtain the corresponding 3-acyl - 1,2,3,4,5,6 - hexahydroazepino[4,5-b]indole (VI); reducing compound VI with lithium aluminum hydride to obtain the corresponding 3-alkyl (or benzyl)-1,2,3,4,5,6-hexahydroazepino[4,5-b] indole (VII).

Alternatively compound V can be alkylated with an alkyl halide in which the alkyl is methyl, ethyl, propyl or isopropyl and the halogen is bromine or iodine or benzylated with benzyl chloride or bromide, in the presence of sodium hydride to give the corresponding 6-alkyl (or benzyl) - 1,2,3,4,5,6-hexahydroazepino[4,5-b]indole (VIII) often isolated as the hydrochloride, hydrobromide or hydroiodide; acylating VIII (as described above for compound V) to give the corresponding 3-acyl-6-alkyl (or benzyl) - 1,2,3,4,5,6 - hexahydroazepino[4,5-b]indole (IX); and reducing compound IX (as described for compound VI) to obtain the corresponding 3-alkyl (or benzyl)-6-alkyl (or benzyl) - 1,2,3,4,5,6 - hexahydroazepino [4,5-b]indole (X).

As an alternative to obtain a compound of Formula VIII in good yield, a compound of Formula III is alkylated with an alkyl halide in the presence of sodium hydride to give a compound of Formula IX wherein R''' is phenyl; treating this compound with lithium aluminum hydride to give a 3-benzyl-6-alkyl-1,2,3,4,5,6-hexahydroazepino[4,5-b]indole (compound X, in which R'' is alkyl and R'''' is benzyl); and hydrogenolyzing this compound in the presence of a palladium catalyst to obtain the corresponding 6-alkyl-1,2,3,4,5,6-hexahydroazepino[4,5-b]indole (VIII).

The novel compounds of Formula XI are active as tranquilizers, sedatives, anorexigenic agents, and antiinflammatory agents in mammals. For example, 6-methyl-1,2,3,4,5,6-hexahydroazepino[4,5-b]indole as hydrochloride inhibited fighting in mice at an $ED_{50}$ (50% effective dosage) of 4.5–5 mg./kg. [chlorpromazine $ED_{50}$ 7.1–9.0 mg./kg.]. Mongrel cats selected for their interest in attacking and killing mice, at 1 to 3 mg./kg. lost interest in mice.

In the chimney test (ability of animals to back up and out of a vertical glass cylinder within 30 seconds) 37.3 mg./kg. is the 50% effective dosage $ED_{50}$ for mice. In the dish test, 2.3 mg./kg. is the $ED_{50}$ for mice.

When 6-methyl-1,2,3,4,5,6-hexahydroazepino[4,5-b]indole·HCl was administered to dogs prior to the feeding period at a dosage of 0.3 to 1.0 mg./kg., the dog refused food 100%. At a dosage of 0.3 to 1 mg./kg. twice daily, the dog significantly reduced food intake during a ten day period.

Weight loss was also found in mice. In man (48 healthy male prisoners, Jackson Prison, Michigan), 6-methyl-1,2,3,4,5,6-hexahydroazepino[4,5-b]indole·HCl in a double blind study (dextroamphetamine, chlorpromazine and placebo) showed to be 60% as effective as dextroamphetamine. Dosage was 25 mg. for each subject (between 195 to 202 lbs., mean average group weight).

Side effects with the methyl azepinoindole were considerably less than with the dextroamphetamine; particularly insomnia, common during the dextroamphetamine treatment, was completely absent.

Other 6-alkyl-1,2,3,4,5,6 - hexahydroazepino[4,5-b]indoles showed among other effects:

TABLE

| 1,2,3,4,5,6-hexahydroazepino[4,5-b] indole plus substituents | $ED_{50}$ (mg./kg.) Chimney test | $ED_{50}$ (mg./kg.) Dish test | Anorexigenic (compared to amphetamine) | Antiinflam. activity compared to butazolidine |
|---|---|---|---|---|
| 6-ethyl | 40 | 18 | 0.67× | 2× |
| 6-methyl-3-methyl | 45 | 18 | 0.13× | 0.7× |
| 6-methyl-3-methyl-9-methoxy | >79 | 32 | | |
| 6-methyl-9-methoxy | >25 | 18 | 0.14× | |
| 6-methyl-10-methoxy | >0.8 | 1.0 | 0.67× | |

If desired, the Formula XI amino compounds can be administered as pharmacologically acceptable acid addition salts, e.g., hydrochlorides, cyclohexanesulfamates, maleates, tartrates, citrates and the like. Due to their transquilizing ability, these compounds have importance for administration in animals which are transported by ship, train, truck and so on. Administration in cattle, horses, dogs, cats or the like, or zoo animals on long voyages, in a quantity between 3 to 4 mg./kg. of body weight produces tranquilization and thereby reduces losses of valuable animals due to overexcitement and fights among the caged animals. The amino compounds are also of importance for the treatment of obesity. The novel amino compounds of Formula XI can be administered to mammals, birds and man by both oral and parenteral routes in order to produce their pharmacological effects. For oral administration, unit dosage forms such as tablets, capsules, powders, granules, syrups, elixirs and the like containing the appropriate amount for treatment are used. For tablets, common pharmaceutical carriers such as starch, lactose, kaolin, dicalcium phosphate and the like are employed. Powders may also be used in gelatin capsules with or without carriers such as methylcellulose, magnesium stearate, calcium stearate, talc and the like. For fluid preparation, these compounds may be dissolved or suspended in aqueous alcoholic vehicles with or without buffering agents and with flavoring mixtures.

Acid addition salts of the Formula VI amino compounds, which salts are not per se useful in therapy, have a variety of applications. Thus, for example, the fluosilicates of these compounds form useful moth-proofing agents as described in U.S. Pats. 1,915,334 and 2,075,359. The thiocyanic acid addition salts of the same compounds, when condensed with formaldehyde, form resinous polymers which according to U.S. Pats. 2,425,320 and 2,606,155 are useful as pickling inhibitors. The trichloroacetic acid addition salts of the amino compounds of Formula XI are useful as herbicides, for example, against Johnson grass, yellow foxtail, green foxtail, Bermuda grass and quackgrass.

The starting compounds (I) for this invention are known phenylhydrazines. The 1-benzoylhexahydro-4H-azepin-4-one is prepared as shown in the preparation.

In carrying out the process of the present invention, the selected phenylhydrazine of Formula I is refluxed with 1-benzoylhexahydro-4H-azepin-4-one in a solvent such as ethanol, benzene, toluene or the like. In the preferred embodiment of this invention, an acid catalyst such as acetic acid in a quantity of about 0.25 to 1.5%, calculated on the amount of solvent, is added to obtain higher yields. The total time of the reaction may vary between half an hour and four hours at the reflux temperature of the solvent. At the termination of the reaction, the product is isolated by conventional means such as by crystallization, filtration, extraction and the like.

The thus - obtained 1-benzoylhexahydro-4H-azepin-4-one phenylhydrazone (II) is thereupon heated with formic acid of a concentration of 88 to 99% for a period usually between 10 minutes and 2 hours in order to provide crude 3-benzoyl-1,2,3,4,5,6-hexahydroazepino[4,5-b]indole (III) which is isolated and purified by conventional procedures, such as pouring the reaction mixture into ice water, collecting the resulting product by filtration and recrystallizing, chromatographing, or extracting the product to obtain the pure 3-benzoyl-1,2,3,4,5,6-hexahydroazepino[4,5-b]indole (III).

The thus - obtained 3 - benzoyl-1,2,3,4,5,6-hexahydroazepino[4,5-b]indole is reduced with a metal hydride, preferably lithium aluminum hydride, in tetrahydrofuran solution. The reaction is, at first, generally carried out under nitrogen during a period of about one-half hour to eight hours at about room temperature, that is, between 20–30° C. Higher or lower temperatures in the initial phase can be used. Thereafter, the temperature is increased to the reflux temperature of the mixture, and the mixture is heated for a period between 6 to 24 hours. The products are obtained by decomposing the reaction mixture, after cooling, with water and a base such as sodium hydroxide or potassium hydroxide and filtering the solution. Concentration of the filtrate gives the desired 3-benzyl-1,2,3,4,5,6-hexahydroazepino[4,5-b]indole (IV).

Removal of the benzyl group of the 3-benzyl-1,2,3,4,5,6-hexahydroazepino[4,5-b]indole is achieved by hydrogenolysis in the presence of a noble metal catalyst, e.g., a palladium or platinum catalyst (5 to 10% platinum or palladium on a carbon carrier). The hydrogenolysis may be carried out at a pressure between 10 to 75 pounds of hydrogen and is generally completed within between 1 to 8 hours at room temperature. At the termination of the reaction, the catalyst is removed by filtration, the filtrate is concentrated and the crude product purified in conventional manner, such as by recrystallization, formation of a salt and treating the salt with a base, or the like.

The thus-obtained 1,2,3,4,5,6-hexahydroazepino[4,5-b]indole (V) is acylated with an acid anydride such as benzoic anhydride, acetic anhydride, propionic anhydride and in the case of a desired 3-formyl-1,2,3,4,5,6-hexahydroazepino[4,5-b]indole, by acylation with formic acetic anhydride (formed in situ from 98% formic acid and acetic anhydride) at room temperature. Instead of acid anhydrides, acyl chlorides or bromides can be used, e.g., acetyl chloride, propionyl chloride, benzoyl chloride or bromides thereof. The acylation can be carried out at temperatures between 0 and 35° C. during a period of between 6 to 48 hours. After termination of the reaction, the mixture is poured into water, the solids are collected by filtration and purified generally by recrystallization or chromatography to give the desired 3-acyl-1,2,3,4,5,6-hexahydroazepino[4,5-b]indole (VI).

The thus-obtained 3-acyl-1,2,3,4,5,6-hexahydroazepino[4,5-b]indole (VI) is reduced with a metal hydride such as lithium aluminum hydride, in an organic solvent such as diethyl ether, diisopropyl ether, tetrahydrofuran or the like, usually at starting temperatures between about 0° C. and room temperature (25–30° C.). Thereafter the reaction is continued usually at the reflux temperature of the mixture for a period of 6 to 48 hours. In the preferred embodiment of this invention, the reaction is carried out in a nitrogen atmosphere. The reaction mixture thereafter is decomposed with water, an aqueous base solution such as sodium or potassium hydroxide and water, and the solution is filtered, the filtrate concentrated and the thus-obtained 3-alkyl (or benzyl)-1,2,3,4,5,6-hexahydroazepino[4,5-b]indole (VII) is purified by conventional means usually by recrystallization from organic solvents such as ethyl acetate, methanol, ethanol, and the like.

The thus-obtained 3-alkyl (or benzyl)-1,2,3,4,5,6-hexahydroazepino[4,5-b]indole (VII) can be alkylated in the 6-position, in conventional manner, with an alkyl bromide or alkyl iodide such as methyl, ethyl, propyl, isopropyl bromide or iodide or with a benzyl halide. In the preferred embodiment of this invention, the 3-alkyl (or benzyl)-1,2,3,4,5,6-hexahydroazepino[4,5-b]indole is dissolved in a dialkylformamide or dialkylacetamide, usually in dimethylformamide, in a nitrogen atmosphere, and thereto is added a suspension of sodium or potassium hydride in mineral oil. To this mixture is added the alkyl (or benzyl)bromide or iodide, usually at a low temperature such as about 0° C. The mixture is allowed to react for a period between 10 minutes and 1 hour and thereafter at room temperature for a period of 6 to 48 hours. The product of Formula X is obtained by pouring the mixture into water and extracting the water with a water-immiscible organic solvent, such as ether, Skellysolve B hexanes, benzene, methylene chloride or the like, and evaporating the solvent. The product may be further purified by recrystallization, extraction of impurities, chromatography, or by preparing water-soluble salts such as hydrochlorides, hydrobromides, sulfates or organic salts like the acetates, chloroacetates, benzoates or the like.

As is obvious to those skilled in the art, many of the different steps shown above in the sequence of formulae are interchangeable and do not need to be performed in the same order as shown in this sequence. Thus, a 1,2,3,4,5,6-hexahydroazepino[4,5-b]indole (V) can be 6-alkylated first to VIII, then 3-acylated (IX) followed by lithium aluminum hydride reduction to give a 3,6-dialkyl-1,2,3,4,5,6-hexahydroazepino[4,5-b]indole X.

The following examples are illustrative of the process and products of the present invention, but are not to be construed as limiting.

PREPARATION

*1-benzoylhexahydro-4H-azepin-4-one*

(A) 1-benzoylhexamethyleneimine [1-benzoylhexahydro-4H-azepine]

Benzoyl chloride (60 ml.) in 200 ml. of Skellysolve B hexanes was added to a stirred, cooled (ice-bath) solution of 200 ml. of hexamethyleneimine in 800 ml. of Skellysolve B hexanes. The mixture was then washed several times with 1 N hydrochloric acid and with water, and filtered through anhydrous sodium sulfate. Evaporation of the Skellysolve B hexanes and distillation of the oily residue gave 40.5 g. of 1-benzoylhexamethyleneimine, B.P. 150–160° C./1 torr.

*Analysis.*—Calcd. for $C_{13}H_{17}NO$ (percent): N, 6.89. Found (percent): N, 6.54.

(B) Fermentation of 1-benzoylhexamethyleneimine

A medium was prepared of 200 g. of cornsteep liquor (60% solids), 100 g. of commercial dextrose, and 10 l. of tap water. The pH was adjusted to between 4.8 and 5 and 10 ml. of lard oil was added as a foam preventive. This medium was sterilized and inoculated with a 72-hour vegetative growth of *Sporotrichum sulfurescens,* ATCC 7159, and after incubation for 24 hours at a temperature of about 28° C. using a rate of aeration of 0.5 l. per minute and agitation of 300 r.p.m., the substrate, 2 g. of 1-benzoylhexamethyleneimine in solution in a minimum amount of acetone (about 20 ml.) was then added to the fermentation. After an additional 72-hour period of incubation at the same temperature and aeration, the beer and mycelium were separated by filtration. The mycelium was washed with water and the wash water was added to the beer filtrate. The thus-obtained beer filtrate was extracted four times with a volume of methylene chloride equal to one-fourth the volume of the filtrate. The combined extracts were washed with one-fourth volume of distilled water and the solvent was removed by distillation to give a residue.

The residue thus obtained was chromatographed on Florisil and eluted with Skellysolve B hexanes containing increasing portions of acetone. The 25% acetone-75% Skellysolve B hexanes eluate gave about 50 mg. of 1-benzoylhexahydro-4H-azepin-4-one and the acetone eluate gave 1 - benzoyl - 4-hydroxyhexahydro-4H-azepine determined by thin layer chromatography.

(C) Oxidation of 1-benzoyl-4-hydroxyhexahydro-4H-azepine

The 1 - benzoyl-4-hydroxyhexahydro-4H-azepine thus obtained was dissolved in acetone and oxidized at room temperature by the addition of a visible excess of Jones' reagent (2.67 M chromic acid reagent prepared from 26.7 g. of chromium trioxide and 23 ml. of sulfuric acid, diluted to 100 ml. with water). The excess oxidant was destroyed by the addition of isopropyl alcohol and the mixture was evaporated to dryness. Water (20 ml.) was added, and the product was extracted with 20 ml. of methylene chloride. The extract was evaporated to dryness and the residual 1-benzoylhexahydro-4H-azepin-4-one thus obtained was combined with the same product obtained directly from the bioconversion. The combined product was chromatographed on a column of Florisil (anhydrous magnesium silicate). The column was eluted with Skellysolve B hexanes containing increasing proportions of acetone and those fractions containing the desired product, as determined by thin layer chromatography, were combined and evaporated to give about 770 mg. of 1-benzylhexahydro-4H-azepin-4-one as an oil, B.P. 170–174° C./0.3 torr., that crystallized slowly.

Analysis.—Calcd. for $C_{13}H_{15}NO_2$ (percent): C, 71,86; H, 6.96; N, 6.45. Found (percent): C, 71.51; H, 7.25; N, 6.46.

EXAMPLE 1

Phenylhydrazone of 1-benzoylhexahydro-4H-azepin-4-one

A mixture of 20 g. (0.092 mole) of 1-benzoylhexahydro-4H-azepin-4-one, 10.5 g. of phenylhydrazine (0.097 mole), 200 ml. of absolute ethanol and 1.5 ml. of acetic acid was refluxed for a period of 1 hour and then cooled in an ice bath. Crystals formed which were collected by filtration, washed with ethanol and dried to yield 20.8 g. (74%) of the phenylhydrazone of 1-benzoylhexahydro-4H-azepin-4-one of melting point 185–190° C.

EXAMPLE 2 p-Methoxyphenylhydrazone of 1-benzoylhexahydro-4H-azepin-4-one

A solution of 120.1 g. (0.869 mole) of p-methoxyphenylhydrazine, 172.0 g. (0.792 mole) of 1-benzoylhexahydro-4H-azepin-4-one and 12.9 ml. of glacial acetic acid in 1725 ml. of absolute ethanol was refluxed in a nitrogen atmosphere for a period of 1 hour. The reaction mixture was then cooled and concentrated under reduced pressure. The product which had crystallized from the solution was collected by filtration, washed with ethanol and dried to give 108.9 g. of 1-benzoylhexahydro-4H-azepin-4-one p-methoxyphenylhydrazone of melting point 155.5–166.5° C. A second crop was obtained by concentrating the mother liquors, providing an additional amount of 32.9 g. so that the total yield was 53%.

EXAMPLE 3 m-Methoxyphenylhydrazone of 1-benzoylhexahydro-4H-azepin-4-one

To a 3 N aqueous sodium hydroxide solution (300 ml.) and ether (300 ml.) was added 62.7 g. (0.360 mole) of m-methoxyphenylhydrazine hydrochloride. This mixture was stirred until the material went into solution, the ether layer was separated and the aqueous layer extracted with additional ether. The ether layer and extracts were washed with brine, dried over anhydrous potassium carbonate and concentrated under reduced pressure at about 25° C. to give a residue. To a solution of the residue in 500 ml. of ethanol was added a solution of 1-benzoylhexahydro-4H-azepin-4-one (65 g.; 0.3 mole) in 300 ml. of ethanol and 5 ml. of acetic acid. The resulting solution was refluxed under nitrogen for 1 hour and then concentrated under reduced pressure. The product which crystallized from the partially concentrated reaction mixture was collected by filtration, washed with ethanol and dried to give 45.2 g. (44.7%) of m-methoxyphenylhydrazone of 1-benzoylhexahydro-4H-azepin-4-one of melting point 153–159° C.

EXAMPLE 4 o-Methoxyphenylhydrazone of 1-benzoylhexahydro-4H-azepin-4-one

To a stirred mixture of 3 N aqueous sodium hydroxide (300 ml.) and 300 ml. of ether was added 62.7 g. (0.360 mole) of o-methoxyphenylhydrazine hydrochloride. After solution was achieved, the aqueous layer was saturated with sodium chloride, separated from the ether layer and extracted with ether. The combined ether layer and extracts were washed with brine, dried over potassium carbonate and concentrated under reduced pressure at 25° C. to give a residue. The residue was dissolved in 500 ml. of ethanol and was thus added to a solution of 65 g. (0.300 mole) of 1-benzoylhexahydro-4H-azepin-4-one in 300 ml. of ethanol and 5 ml. of acetic acid. The mixture was refluxed for 1 hour and concentrated under reduced pressure. The resulting residue was crystallized from ethanol to give a total of 34.3 g. of o-methoxyphenylhydrazone of 1-benzoylhexahydro-4H-azepin-4-one of melting point 145–154° C.

EXAMPLE 5 p-Fluorophenylhydrazone of 1-benzoylhexahydro-4H-azepin-4-one

To a stirred solution of 300 ml. of 3 N sodium hydroxide and 300 ml. of ether was added 58.3 g. (0.360 mole) of p-fluorophenylhydrazine hydrochloride. When solution was obtained, the aqueous layer was saturated with sodium chloride, separated from the ether layer and extracted with ether. The ether layer and extracts were combined, washed with brine, dried over anhydrous potassium carbonate and concentrated in vacuo (at about 25° C.) to give a residue. The residue was dissolved in 500 ml. of ethanol and was thus added to a solution of 65 g. (0.3 mole) of 1-benzoylhexahydro-4H-azepin-4-one in 300 ml. of ethanol and 5 ml. of acetic acid. The resulting solution was refluxed for 1 hour in a nitrogen atmosphere and concentrated under reduced pressure. The product which crystallized from the concentrated mixture was collected by filtration, washed with ethanol and dried to yield 32.7 g. (33.3%) of p-fluorophenylhydrazone of 1 - benzoylhexahydro-4H-azepin-4-one of melting point 150–162° C.

EXAMPLE 6 o-Tolylhydrazone of 1-benzoylhexahydro-4H-azepin-4-one

To 400 ml. of 3 N aqueous sodium hydroxide solution and 400 ml. of ether was added 79.3 g. (0.5 mole) of o-tolylhydrazine hydrochloride. After solution was obtained, the aqueous layer was saturated with sodium chloride, separated from the ether layer and extracted with ether. The combined ether layer and extracts were washed with brine, dried over anhydrous potassium carbonate and concentrated under reduced pressure at 25° C. to give a residue. This residue, dissolved in 700 ml. of ethanol, was mixed with a solution of 108.6 g. (0.5 mole) of 1-benzoylhexahydro-4H-azepin-4-one in 400 ml. of ethanol and 6.95 ml. of acetic acid. The resulting solution was refluxed for a period of 1 hour in a nitrogen atmosphere and then concentrated under reduced pressure. The residue which was obtained was crystallized from ethanol to give 29.7 g. of o-tolylhydrazone of 1-benzoylhexahydro-4H-azepin-4-one of melting point 135–141° C. Another crop was obtained of 4.85 g., thus providing a total yield of 21.5%.

EXAMPLE 7

*p-Tolylhydrazone of 1-benzoylhexahydro-4H-azepin-4-one*

In the manner given in Example 6, a freshly prepared (from 58.5 g. of p-tolylhydrazine hydrochloride) ethanol solution of p-tolylhydrazine was reacted in the presence of acetic acid and in ethanol solution with 1-benzoylhexahydro-4H-azepin-4-one (160 g.) to give in two crops 26.9 g. of p-tolylhydrazone of 1-benzoylhexahydro-4H-azepin-4-one of melting point 145–155° C.

EXAMPLE 8

*p-Ethylphenylhydrazone of 1-benzoylhexahydro-4H-azepin-4-one*

In the same manner given in Example 1, 1-benzoylhexahydro-4H-azepin-4-one was heated with p-ethylphenylhydrazine in absolute ethanol in the presence of acetic acid to give p-ethylphenylhydrazone of 1-benzoylhexahydro-4H-azepin-4-one.

EXAMPLE 9

*p-Propoxyphenylhydrazone of 1-benzoylhexahydro-4H-azepin-4-one*

In the manner given in Example 1, p-propoxyphenylhydrazine was heated with 1-benzoylhexahydro-4H-azepin-4-one in absolute ethanol in the presence of acetic acid to give p-propoxyphenylhydrazone of 1-benzoylhexahydro-4H-azepin-4-one.

EXAMPLE 10

*o-Chlorophenylhydrazone of 1-benzoylhexahydro-4H-azepin-4-one*

In the manner given in Example 1, o-chlorophenylhydrazine was reacted with 1-benzoylhexahydro-4H-azepin-4-one in absolute ethanol in the presence of acetic acid to give o-chlorophenylhydrazone of 1-benzoylhexahydro-4H-azepin-4-one.

In the manner given in Example 1, other substituted phenylhydrazones of 1-benzoylhexahydro-4H-azepin - 4-one can be prepared by heating a selected substituted phenylhydrazine with 1-benzoylhexahydro - 4H - azepin-4-one, dissolved in ethanol, in the presence of acetic acid. Representative compounds thus obtained include:

m-ethylphenylhydrazone;
o-ethylphenylhydrazone;
p-propylphenylhydrazone;
o-propylphenylhydrazone;
m-propylphenylhydrazone;
p-isopropylphenylhydrazone;
o-isopropylphenylhydrazone;
p-chlorophenylhydrazone;
o-bromophenylhydrazone;
m-fluorophenylhydrazone;
o-ethoxyphenylhydrazone;
m-ethoxyphenylhydrazone;
p-isopropoxyphenylhydrazone;
o-propoxyphenylhydrazone;
3,4-dichlorophenylhydrazone;
2,3-difluorophenylhydrazone;
2,3-dibromophenylhydrazone;
3,4-dimethylphenylhydrazone;
2,3-dimethylphenylhydrazone;
2,3-diethoxyphenylhydrazone;
2-ethoxy-3-fluorophenylhydrazone;
2-bromo-4-propoxyphenylhydrazone;
2-methyl-4-chlorophenylhydrazone;

and the like of 1-benzoylhexahydro-4H-azepin-4-one.

EXAMPLE 11

*3-benzoyl-1,2,3,4,5,6-hexahydroazepino[4,5-b]indole*

A mixture of 5 g. (16.3 mmoles) of the phenylhydrazone of 1-benzoylhexahydro-4H-azepin-4-one and 35 ml. of 97% formic acid was heated on the steam bath in a nitrogen atmosphere for 20 minutes. It was then poured into ice-water giving a dark brown solid which was collected by filtration, washed with water and dried in vacuo to yield 4.5 g. of a crude product. This material was chromatographed over 300 g. of silica gel with mixtures of 15–30% acetone, balance cyclohexane. The product thus obtained was evaporated and crystallized from methanol-water to give 1.9 g. (40%) of 3-benzoyl-1,2,3,4,5,6-hexahydroazepino[4,5-b] indole of melting point 169–170° C.

*Analysis.*—Calcd. for $C_{19}H_{18}N_2O$ (percent): C, 78.59; H, 6.25; N, 9.65. Found (percent): C, 78.26; H, 6.22; N, 9.43.

EXAMPLE 12

*3 benzoyl-9-methoxy-1,2,3,4,5,6-hexahydroazepino [4,5-b]indole*

To 100 ml. of about 3 N hydrogen chloride solution in absolute ethanol was added 3.37 g. (0.010 mole) of p-methoxyphenylhydrazone of 1-benzoylhexahydro-4H-azepin-4-one. This mixture was heated on the steam bath for a period of 7 minutes, then poured into ice water. The solid was collected by filtration, washed with water and dissolved in methylene chloride. The methylene chloride solution was dried over anhydrous magnesium sulfate, concentrated to about 10 ml. and poured over a column containing 250 g. of neutral alumina. The column was eluted with 80% ethyl acetate-20% Skellysolve B hexanes and the resulting product crystallized from ethyl acetate to yield 0.3 g. (9.37%) of 3-benzoyl-9-methoxy-1,2,3,4,5,6 - hexahydroazepino[4,5 - b]indole of melting point 129.5–133° C. (dec.).

EXAMPLE 13

*3-benzoyl - 8 - methoxy-1,2,3,4,5,6-hexahydroazepino[4,5-b]indole and 3-benzoyl-10-methoxy-1,2,3,4,5,6-hexahydroazepino[4,5-b]indole*

A mixture of 43.9 g. (0.130 mole) of the m-methoxyphenylhydrazone of 1-benzoylhexahydro - 4H - azepin-4-one and 195 ml. of 88% formic acid was heated on the steam bath in a nitrogen atmosphere for a period of 30 minutes. It was then cooled and poured into ice water. The resulting mixture was extracted with chloroform, the chloroform extracts were washed with water, dried over anhydrous magnesium sulfate and concentrated in vacuo. The resulting residue was chromatographed over 2.2 kg. of silica gel with a mixture of 60% ethyl acetate-40% cyclohexane. Twenty-five 1.5 l. fractions were collected. The first band, obtained from fractions 8–11, was crystalized from methylene chloride-ethyl acetate to yield 2.66 g. of 3-benzoyl - 10 - methoxy-1,2,3,4,5,6-hexahydroazepino[4,5-b]indole of melting point 263.5–267° C. A second crop of this material was obtained weighing 0.185 g. (total yield 6.82%). The product when recrystallized from methylene chloride-methanol gave pure 3-benzoyl-10 - methoxy-1,2,3,4,5,6-hexahydrazepino[4,5-b]indole of melting point 264.5–266.5° C.

*Analysis.*—Calcd. for $C_{20}H_{20}N_2O_2$ (percent): C, 74.97; H, 6.29; N, 8.74. Found (percent): C, 74.49; H, 6.63; N, 9.01.

The second isomer, obtained from fractions 14–17, was crystallized from methylene chloride-ethyl acetate to give 5.86 g. of 3-benzoyl-8-methoxy-1,2,3,4-5,6 - hexahydroazepino[4,5-b] indole of melting point 201.5–203° C. A second fraction of 3.98 g. of the same material was also obtained. Recrystallization of the product from methylene chloride-methanol gave pure 3-benzoyl-8-methoxy-1,2,3,4,5,6-hexahydroazepino[3,4-b] indole of melting point 202–203.5° C.

Analysis.—Calcd. for $C_{20}H_{20}N_2O_2$ (percent): C, 74.97; H, 6.29; N, 8.74. Found (percent): C, 74.77; H, 6.50; N, 8.62.

EXAMPLE 14

*3-benzoyl-7-methoxy-1,2,3,4,5,6-hexahydroazepino [4,5-b] indole*

A mixture of 29.9 g. of (0.0888 mole) of the o-methoxyphenylhydrazone of 1-benzoylhexahydro-4H-azepin-4-one and 88% formic acid (120 ml.) was heated on the steam bath in a nitrogen atmosphere for a period of 30 minutes and poured thereupon into 2.5 l. of ice water. This mixture was extracted with chloroform, the chloroform extracts were washed with water, dried over anhydrous potassium carbonate and concentrated under reduced pressure to give a residue. This residue was chromatographed over silica gel (1.5 kg.) and eluted with 60% ethyl acetate-40% cyclohexane. The product thus obtained was crystallized from ethylene chloride-ethyl acetate to give 1.15 g. of 3 - benzoyl - 7 - methoxy - 1,2,3,4,5,6 - hexahydroazepino[4,5-b] indole of melting point 203–204.5° C. A second crop of 0.754 g. was obtained of the same material providing a total yield of 6.69%.

Analysis.—Calcd. for $C_{20}H_{20}N_2O_2$ (percent): C, 74.97; H, 6.29; N, 8.74. Found (percent): C, 75.00; H, 6.45; N, 8.92.

EXAMPLE 15

*3-benzoyl-9-fluoro-1,2,3,4,5,6-hexahydroazepino [4,5-b] indole*

A mixture of 3.25 g. (0.01 mole) of the p-fluorophenylhydrazone of 1-benzoylhexahydro-4H-azepin - 4 - one in 88% formic acid (15 ml.) was refluxed, under nitrogen, for a period of 30 minutes and reaction mixture was then poured into ice water. The resulting dark, semi-solid mixture was extracted with chloroform. The chloroform extracts were washed with water and dried over anhydrous magnesium sulfate, treated with 10 g. of silica gel and concentrated under reduced pressure. The resulting granular solid was carefully poured onto a column of 200 g. of silica gel and chromatographed with 60% ethyl acetate-40% cyclohexane. The eluates were combined, concentrated and the resulting product crystallized from ethyl acetate-Skellysolve B hexanes to give 1.072 g. (34.8%) of 3-benzoyl-9-fluoro-1,2,3,4,5,6-hexahydroazepino[4,5-b] indole of melting point 131–133° C. This material was recrystallized from ethyl acetate-Skellysolve B hexanes to give 3-benzoyl-9-fluoro-1,2,3,4,5,6 - hexahydroazepino[4,5-b] indole of melting point 165–167° C.

Analysis.—Calcd. for $C_{19}H_{17}N_2OF$ (percent): C, 74.00; H, 5.56; N, 9.09; F, 6.16. Found (percent): C, 73.57; H, 6.02; N, 8.89; F, 5.93.

EXAMPLE 16

*3-benzoyl-7-methyl-1,2,3,4,5,6-hexahydroazepino [4,5-b] indole*

A mixture of 31.3 g. (0.0975 mole) of the o-tolylhydrazone of 1-benzoylhexahydro-4H-azepin-4-one was refluxed in 290 ml. of 88% formic acid in a nitrogen atmosphere for a period of 30 minutes. The reaction mixture was poured into ice water, extracted several times with methylene chloride, the methylene chloride extracts were combined, dried over anhydrous magnesium sulfate and concentrated under reduced pressure to give a residue. This residue was chromatographed over 1.5 kg. of silica gel using 60% ethyl acetate-40% cyclohexane. The fractions were combined, crystallized and concentrated to give a solid which was recrystallized from ethyl acetate-Skellysolve B hexanes to give 10.0 g. of 3-benzoyl-7-methyl-1,2,3,4,5,6-hexahydroazepino[4,5-b] indole of melting point 187–188.5° C. A second fraction of 1.26 g. of the same material was obtained raising the yield to 37.9%. Recrystallization of this material from ethyl acetate gave pure 3-benzoyl-7-methyl-1,2,3,4,5,6 - hexahydroazepino[4,5-b] indole of melting point 189–190° C.

Analysis.—Calcd. for $C_{20}H_{20}N_2O$ (percent): C, 78.92; H, 6.62; N, 9.20. Found (percent): C, 78.70; H, 6.79; N, 8.99.

EXAMPLE 17

*3-benzoyl-9-methyl-1,2,3,4,5,6-hexahydroazepino [4,5-b] indole*

A stirred mixture of 26.9 g. (0.0837 mole) of the p-tolylhydrazone of 1-benzoylhexahydro-4H-azepin- 4 - one was refluxed with 125 ml. of 88% formic acid in a nitrogen atmosphere for a period of 30 minutes. The reaction mixture was poured into ice water, then extracted several times with chloroform. The chloroform extracts were washed with water, dried over anhydrous magnesium sulfate and concentrated under reduced pressure. The resulting residue was chromatographed on a column containing 1 kg. of silica gel, using a mixture of 60% ethyl acetate-40% cyclohexane. The eluates were combined and concentrated to give 10.33 g. of product (40.6% yield) which was recrystallized from methylene chloride methanol to give pure 3-benzoyl-9-methyl-1,2,3,4,5,6-hexahydroazepino[4,5-b] indole of melting point 210–211° C.

Analysis.—Calcd. for $C_{20}H_{20}N_2O$ (percent): C, 78.92; H, 6.62; N, 9.20. Found (percent): C, 78.30; H, 6.80; N, 9.10.

EXAMPLE 18

*3-benzoyl-7-chloro-1,2,3,4,5,6-hexahydroazepino[4,5] indole*

In the manner given in Example 11, the o-chlorophenylhydrazone of 1-benzoylhexahydro-4H-azepin-4-one was heated in formic acid to give 3-benzoyl-7-chloro-1,2,3,4,5, 6-hexahydroazepino[4,5-b]indole.

EXAMPLE 19

*3-benzoyl-9-ethyl-1,2,3,4,5,6-hexahydroazepino[4,5-b] indole*

In the manner given in Example 11, the p-ethylphenylhydrazone of 1-benzoylhexahydro-4H-azepin-4-one was heated in formic acid to give 3-benzoyl-9-ethyl-1,2,3,4,5,6-hexahydroazepino[4,5-b]indole.

EXAMPLE 20

*3-benzoyl-9-propoxy-1,2,3,4,5,6-hexahydroazepino[4,5-b] indole*

In the manner given in Example 11, the p-propoxyphenylhydrazone of 1-benzoylhexahydro-4H-azepin-4-one was heated in formic acid to give 3-benzoyl-9-propoxy-1,2, 3,4,5,6-hexahydroazepino[4,5-b]indole.

In the same manner given in Example 11, other 3-benzoyl-substituted 1,2,3,4,5,6-hexahydroazepino[4,5 - b] indoles are obtained by heating a substituted phenylhydrazone of 1-benzoylhexahydro-4H-azepin-4 - one with formic acid. Representative compounds, thus obtained, include:

3-benzoyl-8-ethyl-1,2,3,4,5,6-hexahydroazepino[4,5-b] indole;
3-benzoyl-10-ethyl-1,2,3,4,5,6-hexahydroazepino[4,5-b] indole;
3-benzoyl-7-ethyl-1,2,3,4,5,6-hexahydroazepino[4,5-b] indole;
3-benzoyl-9-propyl-1,2,3,4,5,6-hexahydroazepino[4,5-b] indole;
3-benzoyl-7-propyl-1,2,3,4,5,6-hexahydroazepino[4,5-b] indole;
3-benzoyl-8-propyl-1,2,3,4,5,6-hexahydroazepino[4,5-b] indole;

3-benzoyl-10-propyl-1,2,3,4,5,6-hexahydroazepino[4,5-b]indole;
3-benzoyl-9-isopropyl-1,2,3,4,5,6-hexahydroazepino[4,5-b]indole;
3-benzoyl-7-isopropyl-1,2,3,4,5,6-hexahydrozaepino[4,5-b]indole;
3-benzoyl-9-chloro-1,2,3,4,5,6-hexahydroazepino[4,5-b]indole;
3-benzoyl-7-bromo-1,2,3,4,5,6-hexahydroazepino[4,5-b]indole;
3-benzoyl-8-fluoro-1,2,3,4,5,6-hexahydroazepino[4,5-b]indole;
3-benzoyl-10-fluoro-1,2,3,4,5,6-hexahydroazepino[4,5-b]indole;
3-benzoyl-7-ethoxy-1,2,3,4,5,6-hexahydroazepino[4,5-b]indole;
3-benzoyl-8-ethoxy-1,2,3,4,5,6-hexahydroazepino[4,5-b]indole;
3-benzoyl-9-isopropoxy-1,2,3,4,5,6-hexahydroazepino[4,5-b]indole;
3-benzoyl-8,9-dichloro-1,2,3,4,5,6-hexahydroazepino[4,5-b]indole;
3-benzoyl-9,10-dichloro-1,2,3,4,5,6-hexahydroazepino[4,5-b]indole;
3-benzoyl-7,8-difluoro-1,2,3,4,5,6-hexahydroazepino[4,5-b]indole;
3-benzoyl-7,8-dibromo-1,2,3,4,5,6-hexahydroazepino[4,5-b]indole;
3-benzoyl-8,9-dimethyl-1,2,3,4,5,6-hexahydroazepino[4,5-b]indole;
3-benzoyl-9,10-dimethyl-1,2,3,4,5,6-hexahydroazepino[4,5-b]indole;
3-benzoyl-7,8-dimethyl-1,2,3,4,5,6-hexahydroazepino[4,5-b]indole;
3-benzoyl-7,8-diethoxy-1,2,3,4,5,6-hexahydroazepino[4,5-b]indole;
3-benzoyl-7-ethoxy-8-fluoro-1,2,3,4,5,6-hexahydroazepino[4,5-b]indole;
3-benzoyl-7-bromo-9-propoxy-1,2,3,4,5,6-hexahydroazepino[4,5-b]indole;
3-benzoyl-7-methyl-9-chloro-1,2,3,4,5,6-hexahydroazepino[4,5-b]indole;
and the like.

EXAMPLE 21

*3-benzyl-1,2,3,4,5,6-hexahydroazepin[4,5-b]indole*

To a stirred mixture of 6 g. of lithium aluminum hydride in 400 ml. of dry tetrahydrofuran was added a solution of 6 g. (20.6 mmoles) of 3-benzoyl-1,2,3,4,5,6-hexahydroazepino[4,5-b]indole in 150 ml. of tetrahydrofuran. The addition was carried out in a nitrogen atmosphere during one hour. The resulting mixture was stirred at room temperature (about 25° C.) for about 4 hours and then refluxed for 18 hours. The mixture was then cooled in an ice bath and treated first with 6 ml. of water, then with 6 ml. of 15% sodium hydroxide solution and then with 18 ml. of water. This mixture was stirred for 2 hours and then filtered. The filtrate was concentrated under reduced pressure to give a residue and the residue was crystallized from ethyl acetate-Skellysolve B hexanes to give 3.37 g. (59%) of 3-benzyl-1,2,3,4,5,6-hexahydroazepino[4,5-b]indole of melting point 116–117° C.

*Analysis.*—Calcd. for $C_{19}H_{20}N_2$ (percent): C, 82.57; H, 7.30; N, 10.14. Found (percent): C, 82.34; H, 7.52; N, 10.04.

EXAMPLE 22

*3-benzyl-9-methoxy-1,2,3,4,5,6-hexahydroazepino[4,5-b]indole*

To an ice-cold suspension of 1 g. of lithium aluminum hydride in 100 ml. of tetrahydrofuran was added 1 g. (0.00312 mole) of 3-benzoyl-9-methoxy-1,2,3,4,5,6-hexahydroazepino[4,5-b]indole and the mixture was refluxed in a nitrogen atmosphere for a period of 18 hours. Therefater, the mixture was cooled in an ice bath and treated successively with 1 ml. of water, 1 ml. of 15% aqueous sodium hydroxide solution and 3 ml. of water. The resulting mixture was filtered and the filtrate concentrated in vacuo to give a solid which was recrystallized from ethyl acetate to give 0.773 g. (81%) of product which again was recrystallized from ethyl acetate-Skellysolve B hexanes to give pure 3-benzyl-9-methoxy-1,2,3,4,5,6-hexahydroazepino[4,5-b]indole of melting point 127.5–129.5° C.

*Analysis.*—Calcd. for $C_{20}H_{22}N_2O$ (percent): C, 78.40; H, 7.24; N, 9.14. Found (percent): C, 78.54; H, 7.35; N, 9.42.

EXAMPLE 23

*3-benzyl-8-methoxy-1,2,3,4,5,6-hexahydroazepino[4,5-b]indole*

To a stirred, ice-cold suspension of 9 g. of lithium aluminum hydride in 900 ml. of tetrahydrofuran was added 8.93 g. (0.0279 mole) of 3-benzoyl-8-methoxyl-1,2,3,4,5,6-hexahydroazepino[4,5-b]indole. The mixture was refluxed in a nitrogen atmosphere for a period of 18 hours, cooled in an ice bath and treated successively with 9 ml. of water, 9 ml. of 15% aqueous sodium hydroxide and 27 ml. of water. The mixture was then filtered, the filtrate evaporated, the residue crystallized from ethyl acetate to give 6.62 g. (77.4%) of product which upon recrystallization from ethyl acetate gave 3-benzyl-8-methoxy-1,2,3,4,5,6-hexahydroazepino[4,5-b]indole of melting point 146.5–147° C.

*Analysis.*—Calcd. for $C_{20}H_{22}N_2O$ (percent): C, 78.40; H, 7.24; N, 9.14. Found (percent): C, 78.25; H, 7.44; N, 9.33.

EXAMPLE 24

*3-benzyl-10-methoxy-1,2,3,4,5,6-hexahydroazepino[4,5-b]indole*

To an ice-cold, stirred suspension of lithium aluminum hydride (3 g.) in 300 ml. of tetrahydrofuran was added 2.35 g. (7.26 mmoles) of 3-benzoyl-10-methoxy-1,2,3,4,5,6-hexahydroazepino[4,5-b]indole. This mixture was refluxed for 18 hours in a nitrogen atmosphere, then cooled in an ice bath and treated successively with 3 ml. of water, 3 ml. of 15% aqueous sodium hydroxide and 9 ml. of water. The mixture was thereupon filtered, the collected solids washed with tetrahydrofuran and the washings and filtrate combined and concentrated to give a solid crude product. This product was crystallized from ethyl acetate-Skellysolve B hexanes to give 1.85 g. (83.3%) of 3-benzyl-10-methoxy-1,2,3,4,5,6-hexahydroazepino[4,5 - b]indole, which after recrystallization from the same solvent mixture had a melting point of 163.5–164.5° C.

*Analysis.*—Calcd. for $C_{20}H_{22}N_2O$ (percent): C, 78.40; H, 724; N, 9.14. Found (percent): C, 78.80; H, 7.42; N, 9.03.

EXAMPLE 25

*3-benzyl-7-methoxy-1,2,3,4,5,6-hexahydroazepino-[4,5-b]indole hydrochloride*

To a stirred, ice-cold suspension of 2 g. of lithium aluminum hydride in 200 ml. of tetrahydrofuran was added 1.85 g. (5.77 mmoles) of 3-benzoyl-7-methoxy-1,2,3,4,5,6-hexahydroazepino[4,5-b]indole. The resulting mixture was refluxed for 18 hours in a nitrogen atmosphere and then decomposed by the successive addition of 2 ml. of water, 15% aqueous sodium hydroxide (2 ml.) and 6 ml. of water. The resulting mixture was filtered and the filtrate concentrated under reduced pressure to give a residue. A solution of this residue in ethyl acetate was acidified with methanolic hydrogen chloride, and the resulting crystalline hydrochloride was collected by filtration and dried to yield 1.81 g. (91.5%) of 3-benzyl-7 - methoxy - 1,2,3,4,5,6 - hexadehydroazepino[4,5-b]indole hydrochloride of melting point 251–252.5° C. The recrystallized material from methanol-ethyl acetate melted at 247–248° C. (dec.).

Analysis.—Calcd. for $C_{20}H_{23}ClN_2O$ (percent): C, 70.06; H, 6.76; N, 8.17; Cl, 10.34. Found (percent): C, 70.15; H, 6.94; N, 8.12; Cl, 10.32.

EXAMPLE 26

*3-benzyl-9-fluoro-1,2,3,4,5,6-hexahydroazepino [4,5-b]indole*

To a stirred, ice-cold suspension of 8 g. of lithium aluminum hydride in 800 ml. of dry tetrahydrofuran was added 6.94 g. (0.0225 mole) of 3-benzoyl-9-fluoro-1,2,3,4,5,6-hexahydroazepino[4,5-b]indole. The resulting mixture was refluxed for 10 hours under nitrogen, cooled in an ice bath and treated successively with 8 ml. of water, 8 ml. of 15% aqueous sodium hydroxide and 24 ml. of water. The mixture was filtered, the solids washed with tetrahydrofuran and the filtrate combined with the washings was concentrated in vacuo to give a residue. The residue was crystallized from ethyl acetate to yield 5.53 g. (83.6%) of product which after additional recrystallization from ethyl acetate gave 3-benzyl-9-fluoro-1,2,3,4,5,6-hexahydroazepino[4,5-b]indole of melting point 143–144° C.

Analysis.—Calcd. for $C_{19}H_{19}N_2F$ (percent): C, 77.52; H, 6.51; N, 9.52; F, 6.45. Found (percent): C, 77.81; H, 6.52; N, 9.25; F, 6.25.

EXAMPLE 27

*3-benzyl-7-methyl-1,2,3,4,5,6-hexahydroazepino- [4,5-b]indole hydrochloride*

A solution of 11.6 g. (0.0376 mole) of 3-benzoyl-7-methyl-1,2,3,4,5,6-hexahydroazepino[4,5-b]indole in 300 ml. of tetrahydrofuran was added under nitrogen to an ice-cold, stirred suspension of 11 g. of lithium aluminum hydride in 700 ml. of tetrahydrofuran. The resulting mixture was refluxed for 18 hours; cooled in an ice bath and treated successively with 11 ml. of water, 11 ml. of 15% sodium hydroxide and 33 ml. of water. This mixture was filtered and the filtrate concentrated under reduced pressure. A solution of the residual oil in ethyl acetate was acidified with methanolic hydrogen chloride to yield 5.15 g. (41.9%) of 3-benzyl-7-methyl-1,2,3,4,5,6-hexahydroazepino[4,5-b]indole hydrochloride which after recrystallization from methanol-ethyl acetate melted at 210.5–212° C.

Analysis.—Calcd. for $C_{20}H_{23}N_2Cl$ (percent): C, 73.49; H, 7.09; N, 8.57; Cl, 10.85. Found (percent): C, 73.09; H, 7.27; N, 8.18; Cl, 10.60.

EXAMPLE 28

*3-benzyl-9-methyl-1,2,3,4,5,6-hexahydroazepino- [4,5-b]indole*

A solution of 9.56 g. (0.0310 mole) of 3-benzoyl-9-methyl-1,2,3,4,5,6-hexahydroazepino[4,5-b]indole in 300 ml. of tetrahydrofuran was added under a nitrogen atmosphere to a stirred, ice-cold suspension of 10 g. of lithium aluminum hydride in 700 ml. of tetrahydrofuran. The resulting mixture was refluxed for 16 hours, cooled in an ice bath and treated successively with water (10 ml.), of 15% aqueous sodium hydroxide and 30 ml. of water. This mixture was allowed to stir for 1 hour, was then filtered and the filtrate concentrated in vacuo to give an oil which was crystallized from ethyl acetate to give three crops of product: 7.27 g. melting at 140.5–142° C., 0.702 g. melting at 129–136° C. and 0.395 g. melting at 123.5–134° C. of 3-benzyl-9-methyl-1,2,3,4,56-hexahydroazepino[4,5-b]indole (93% yield). Recrystallizing this material from ethyl acetate-Skellysolve B hexanes gave a pure product melting at 142.5–143.5° C.

Analysis.—Calcd. for $C_{20}H_{22}N_2$ (percent): C,82.72; H, 7.64; N, 9.65. Found (percent): C, 82.38; H, 7.91; N, 9.96.

EXAMPLE 29

*3-benzyl-7-chloro-1,2,3,4,5,6-hexahydroazepino- [4,5-b]indole*

In the manner given in Example 21, 3-benzoyl-7-chloro-1,2,3,4,5,6-hexahydroazepino[4,5-b]indole was reduced with lithium aluminum hydride to give 3-benzyl-7-chloro-1,2,3,4,5,6-hexahydroazepino[4,5-b]indole.

EXAMPLE 30

*3-benzyl-9-ethyl-1,2,3,4,5,6-hexahydroazepino [4,5-b]indole*

In the manner given in Example 21, 3-benzoyl-9-ethyl-1,2,3,4,5,6-hexahydroazepino[4,5-b]indole was reduced with lithium aluminum hydride to give 3-benzyl-9-ethyl-1,2,3,4,5,6-hexahydroazepino[4,5-b]indole.

EXAMPLE 31

*3-benzyl-9-propoxy-1,2,3,4,5,6-hexahydroazepino- [4,5-b]indole*

In the manner given in Example 21, 3-benzoyl-9-propoxy-1,2,3,4,5,6-hexahydroazepino[4,5-b]indole was reduced with lithium aluminum hydride to give 3-benzyl-9-propoxy-1,2,3,4,5,6-hexahydroazepino[4,5-b]indole.

In the manner given in Example 21, other 3-benzyl-substituted 1,2,3,4,5,6 - hexahydroazepino[4,5 - b]indoles are obtained by reducing 3-benzoyl-substituted 1,2,3,4,5,6-hexahydroazepino[4,5-b]indoles with a metal hydride such as lithium aluminum hydride. Representative compounds thus obtained include:

3-benzyl-8-ethyl-1,2,3,4,5,6-hexahydroazepino[4,5-b] indole;
3-benzyl-10-ethyl-1,2,3,4,5,6-hexahydroazepino[4,5-b] indole;
3-benzyl-7-ethyl-1,2,3,4,5,6-hexahydroazepino[4,5-b] indole;
3-benzyl-9-propyl-1,2,3,4,5,6-hexahydroazepino[4,5-b] indole;
3-benzyl-7-propyl-1,2,3,4,5,6-hexahydroazepino[4,5-b] indole;
3-benzyl-8-propyl-1,2,3,4,5,6-hexahydroazepino[4,5-b] indole;
3-benzyl-10-propyl-1,2,3,4,5,6-hexahydroazepino[4,5-b] indole;
3-benzyl-9-isopropyl-1,2,3,4,5,6-hexahydroazepino[4,5-b]indole;
3-benzyl-7-isopropyl-1,2,3,4,5,6-hexahydroazepino [4,5-b]indole;
3-benzyl-9-chloro-1,2,3,4,5,6-hexahydroazepino[4,5-b] indole;
3-benzyl-7-bromo-1,2,3,4,5,6-hexahydroazepino[4,5-b] indole;
3-benzyl-8-fluoro-1,2,3,4,5,6-hexahydroazepino[4,5-b] indole;
3-benzyl-10-fluoro-1,2,3,4,5,6-hexahydroazepino[4,5-b] indole;
3-benzyl-7-ethoxy-1,2,3,4,5,6-hexahydroazepino[4,5-b] indole;
3-benzyl-8-ethoxy-1,2,3,4,5,6-hexahydroazepino[4,5-b] indole;
3-benzyl-10-ethoxy-1,2,3,4,5,6-hexahydroazepino[4,5-b] indole;
3-benzyl-9-isopropoxy-1,2,3,4,5,6-hexahydroazepino [4,5-b]indole;
3-benzyl-8,9-dichloro-1,2,3,4,5,6-hexahydroazepino [4,5-b]indole;
3-benzyl-9,10-dichloro-1,2,3,4,5,6-hexahydroazepino [4,5-b]indole;
3-benzyl-7,8-difluoro-1,2,3,4,5,6-hexahydroazepino [4,5-b]indole;
3-benzyl-7,8-dibromo-1,2,3,4,5,6-hexahydroazepino [4,5-b]indole;
3-benzyl-8,9-dimethyl-1,2,3,4,5,6-hexahydroazepino [4,5-b]indole;

3-benzyl-9,10-dimethyl-1,2,3,4,5,6-hexahydroazepino[4,5-b]indole;
3-benzyl-7,8-dimethyl-1,2,3,4,5,6-hexahydroazepino[4,5-b]indole;
3-benzyl-7,8-diethoxy-1,2,3,4,5,6-hexahydroazepino[4,5-b]indole;
3-benzyl-7-ethoxy-8-fluoro-1,2,3,4,5,6-hexahydroazepino[4,5-b]indole;
3-benzyl-7-bromo-9-propoxy-1,2,3,4,5,6-hexahydroazepino[4,5-b]indole;
3-benzyl-7-methyl-9-chloro-1,2,3,4,5,6-hexahydroazepino[4,5-b]indole;
and the like.

EXAMPLE 32

*1,2,3,4,5,6-hexahydroazepino[4,5-b]indole and cyclohexanesulfamate thereof*

A solution of 3-benzyl-1,2,3,4,5,6-hexahydroazepino[4,5-b]indole (1 g.; 3.61 mmoles) in 150 ml. of ethanol was treated with 100 mg. of 10% palladium-on-carbon catalyst and hydrogenolyzed in a Parr apparatus at an initial pressure of 50 pounds p.s.i. of hydrogen. After 1.5 hours the reaction was completed and the catalyst removed by filtration. The filtrate was concentrated in vacuo to give a residue which was dissolved in 100 ml. of benzene and the solution was concentrated to give solid crude 1,2,3,4,5,6-hexahydroazepino[4,5-b]indole. This material was dissolved in 10 ml. of ethyl acetate and treated with a solution of cyclohexanesulfamic acid (0.5 g.) in 3 ml. of ethanol. The crystalline salt which resulted was recrystallized from isopropyl alcohol-Skellysolve B hexanes to give 0.17 g. (13.2%) of 1,2,3,4,5,6-hexahydroazepino[4,5-b]indole cyclohexanesulfamate of melting point 164–165° C.

*Analysis.*—Calcd. for $C_{18}H_{27}N_3O_3S$ (percent): C, 59.15; H, 7.45; N, 11.50; S, 8.77. Found (percent): C, 59.16; H, 7.47; N, 11.18; S, 8.62.

EXAMPLE 33

*1,2,3,4,5,6-hexahydroazepino[4,5-b]indole hydrochloride*

A solution of 7.58 g. (0.0407 mole) of 1,2,3,4,5,6-hexahydroazepino[4,5-b]indole, obtained as in Example 32, in methanolethyl acetate was acidified with methanolic hydrogen chloride. Crystallization of the resulting hydrochloride gave 6.74 g. (74.4%) of 1,2,3,4,5,6-hexahydroazepino[4,5-b]indole hydrochloride of melting point 250.5–251.5° C. After recrystallization from methanolethyl acetate, the material had a melting point of 247.5–248.5° C.

*Analysis.*—Calcd. for $C_{12}H_{15}N_2Cl$ (percent): C, 64.71; H, 6.79; N, 12.58; Cl, 15.92. Found (percent): C, 64.93; H, 7.08; N, 12.70; Cl, 16.10.

EXAMPLE 34

*9-methoxy-1,2,3,4,5,6-hexahydroazepino[4,5-b]indole and hydrochloride thereof*

A solution of 3-benzyl-9-methoxy-1,2,3,4,5,6-hexahydroazepino[4,5-b]indole (5.21 g.; 0.017 mole) in a mixture of 47 ml. of acetic acid and 100 ml. of 95% ethanol was treated with 10% palladium-on-carbon catalyst (1 g.) and the mixture hydrogenolyzed at an initial pressure of 40 p.s.i. in a Parr apparatus during 2 hours. The reaction mixture was then filtered through Celite (diatomaceous earth) and the filtrate concentrated under reduced pressure to give a residue. The residue was dissolved in water, cooled in an ice bath and made alkaline with sodium hydroxide solution. The crystalline solid which was thus obtained was collected by filtration, washed with water and dried in vacuo to yield 3.53 g. of 9-methoxy-1,2,3,4,5,6-hexahydroazepino[4,5-b]indole of melting point 174–176° C.

A solution of this material in methanol was acidified with methanolic hydrogen chloride and the resulting salt was crystallized from methanol to yield 3.96 g. (92.3%) of 9-methoxy-1,2,3,4,5,6-hexahydroazepino[4,5-b]indole hydrochloride of melting point 234–236° C., which after recrystallization from methanol was 235–235.5° C.

*Analysis.*—Calcd. for $C_{13}H_{17}ClN_2O$ (percent): C, 61.77; H, 6.78; Cl, 14.03; N, 11.09. Found (percent): C, 61.30; H, 6.85; Cl, 14.11; N, 10.99.

EXAMPLE 35

*8-methoxy-1,2,3,4,5,6-hexahydroazepino[4,5-b]indole and hydrochloride thereof*

A mixture of 6.34 g. (0.0207 mole) of 3-benzyl-8-methoxy - 1,2,3,4,5,6 - hexahydroazepino[4,5-b]indole, 95%, ethanol (200 ml.) and 1 g. of 10% palladium-on-carbon catalyst was hydrogenolyzed at an initial pressure of 39.5 p.s.i. for 8 hours. The resulting mixture was filtered through Celite (diatomaceous earth) and the filtrate was concentrated in vacuo to give a residue. This residue was crystallized from methanol-ethyl acetate to give 3.24 g. (72.4%) of 8-methoxy-1,2,3,4,5,6-hexahydropino[4,5-b]indole of melting point 158–160.5° C.

A solution of the base in methanol was acidified with methanolic hydrogen chloride and the salt was recrystallized from water to give 8-methoxy-1,2,3,4,5,6-hexahydroazepino[4,5-b]indole hydrochloride of melting point 276–276.5 C. (dec.).

*Analysis.*—Calcd. for $C_{13}H_{17}ClN_2O$ (percent): C, 61.77; H, 6.78; N, 11.09; Cl, 14.03. Found (percent): C, 62.03; H, 6.87; N, 11.17; Cl, 14.12.

EXAMPLE 36

*10-methoxy-1,2,3,4,5,6-hexahydroazepino[4,5-b]indole and hydrochloride thereof*

A mixture of 3-benzyl-10-methoxy-1,2,3,4,5,6-hexahydroazepino[4,5-b]indole (1.66 g.; 5.42 mmoles), 200 ml. of 95% ethanol and 0.5 g. of 10% palladium-on-carbon catalyst was hydrogenolyzed at an initial pressure of 41 p.s.i. over a period of 7 hours. The catalyst was removed by filtration through Celite (diatomaceous earth) and the filtrate was concentrated under reduced pressure to give 10 - methoxy - 1,2,3,4,5,6-hexahydroazepino[4,5-b]indole as an oil.

This oil was dissolved in methanol and acidified with methanolic hydrogen chloride. The resulting salt was crystallized from methanol-ethyl acetate to give 1.04 g. (75.6%) of 10-methoxy-1,2,3,4,5,6-hexahydroazepino[4,5-b]indole hydrochloride which after additional recrystallization from methanolethyl acetate had a melting point of 236° C.

*Analysis.*—Calcd. for $C_{13}H_{17}ClN_2O$ (percent): C, 61.77; H, 6.78; N, 11.09; Cl, 14.03. Found (percent): C, 61.95; H, 6.49; N, 10.98; Cl, 14.06.

EXAMPLE 37

*7-methoxy-1,2,3,4,5,6-hexahydroazepino[4,5-b]indole hydrochloride*

A mixture of 1.61 g. (4.70 mmoles) of 3-benzyl-7-methoxy - 1,2,3,4,5,6-hexahydroazepino[4,5-b]indole hydrochloride, 100 ml. of 95% ethanol and 200 mg. of 10% palladium-on-carbon catalyst was hydrogenolyzed for a period of 2.75 hours at an initial pressure of 38 p.s.i. The resulting mixture was filtered and the filtrate was concentrated under reduced pressure to give a residue which was recrystallized from methanol to give 0.782 g. of material of melting point 275–277° C. and 0.233 g. of material of melting point 278–279° C. (85.4% yield). This material was recrystallized from methanol to give 7-methoxy-1,2,3,4,5,6 - hexahydroazepino[4,5-b]indole hydrochloride of melting point 275–275.5° C.

*Analysis.*—Calcd. for $C_{13}H_{17}ClN_2O$ (percent): C, 61.77; H, 6.78; N, 11.09; Cl, 14.03. Found (percent): C, 61.83; H, 6.71; N, 10.92; Cl, 13.85, 13.77.

EXAMPLE 38

*9-fluoro-1,2,3,4,5,6-hexahydroazepino[4,5-b]indole*

A mixture of 5.58 g. (0.0190 mole) of 3-benzyl-9-fluoro-1,2,3,4,5,6-hexahydroazepino[4,5-b]indole, 250 ml. of 95% ethanol and 10% palladium-on-carbon catalyst was hydrogenolyzed in a Parr apparatus for 170 minutes at an initial pressure of 29 p.s.i. The reaction mixture was then filtered through Celite (diatomaceous earth) and the filtrate concentrated in vacuo to give a crystalline residue which was recrystallized from ethyl acetate to give 3.36 g. (86.7%) of 9-fluoro-1,2,3,4,5,6-hexahydroazepino[4,5-b]indole, which after additional recrystallization from ethyl acetate, had a melting point of 179–180° C.

*Analysis.*—Calcd. for $C_{12}H_{13}N_2F$ (percent): C, 70.56; H, 6.41; N, 13.72; F, 9.30. Found (percent): C, 70.70; H, 6.09; N, 13.60; F, 9.09.

EXAMPLE 39

*7-methyl-1,2,3,4,5,6-hexahydroazepino[4,5-b]indole hydrochloride*

A mixture of 4.84 g. (0.0148 mole) of 3-benzyl-methyl-1,2,3,4,5,6-hexahydroazepino[4,5-b]indole hydrochloride, 200 ml. of 95% ethanol and 1 g. of 10% palladium-on-carbon catalyst was hydrogenolyzed for a period of 2.5 hours at an initial pressure of 41 p.s.i. The catalyst was removed by filtration through Celite (diatomaceous earth) and the filtrate was concentrated under reduced pressure to yield a crystalline residue. This crystalline residue was recrystallized from methanol to give a total of 2.64 g. (75.0%) of 7 - methyl-1,2,3,4,5,6-hexahydroazepino[4,5-b]indole hydrochloride which after an additional recrystallization from methanol melted at 271° C. (dec.).

*Analysis.*—Calcd. for $C_{13}H_{17}N_2Cl$ (percent): C, 65.95; H, 7.24; N, 11.84; Cl, 14.98. Found (percent): C, 65.93; H, 7.26; N, 11.53; Cl, 14.90.

EXAMPLE 40

*9-methyl-1,2,3,4,5,6-hexahydroazepino[4,5-b]indole*

A solution of 7.89 g. (0.0272 mole) of 3-benzyl-9-methyl-1,2,3,4,5,6-hexahydroazepino[4,5-b]indole in 200 ml. of 95% ethanol and 10 ml. of glacial acetic acid was treated with 1 g. of 10% palladium-on-carbon catalyst and hydrogenolyzed at an initial pressure of 30 p.s.i. during a period of 1.5 hours. The reaction mixture was then filtered through Celite (diatomaceous earth) and the filtrate was concentrated in vacuo to give a residue. A solution of this residue in water was decolorized with active charcoal (Darco G60). The solution was cooled in an ice bath and made alkaline with sodium hydroxide. The resulting crystalline product was collected by filtration, washed with water and dried in vacuo to give 5.18 g. (95.2%) of 9 - methyl - 1,2,3,4,5,6 - hexahydroazepino-[4,5-b]indole which after recrystallization from methylene chloride-methanol had a melting point of 243.5–245° C. (dec.).

*Analysis.*—Calcd. for $C_{13}H_{16}N_2$ (percent): C, 77.96; H, 8.05; N, 13.99. Found (percent): C, 77.76; H, 8.38; N, 13.93.

EXAMPLE 41

*7-chloro-1,2,3,4,5,6-hexahydroazepino[4,5-b]indole*

In the manner given in Example 32, 3-benzyl-7-chloro-1,2,3,4,5,6-hexahydroazepino[4,5-b]indole was hydrogenolyzed in the presence of a palladium-on-charcoal catalyst to give 7-chloro-1,2,3,4,5,6-hexahydroazepino[4,5-b]indole.

EXAMPLE 42

*9-ethyl-1,2,3,4,5,6-hexahydroazepino[4,5-b]indole*

In the manner given in Example 32, 3-benzyl-9-ethyl-1,2,3,4,5,6-hexahydroazepino[4,5-b]indole was hydrogenolyzed in the presence of a palladium-on-charcoal catalyst to give 9-ethyl-1,2,3,4,5,6-hexahydroazepino[4,5-b]indole.

EXAMPLE 43

*9-propoxy-1,2,3,4,5,6-hexahydroazepino[4,5-b]indole*

In the manner given in Example 32, 3-benzyl-9-propoxy-1,2,3,4,5,6-hexahydroazepino[4,5-b]indole was hydrogenolyzed in the presence of a palladium-on-charcoal catalyst to give 9-propoxy-1,2,3,4,5,6-hexahydroazepino-[4,5-b]indole.

In the manner given in Example 32, other substituted 1,2,3,4,5,6-hexahydroazepino[4,5-b]indoles are prepared from 3-benzyl-substituted 1,2,3,4,5,6 - hexahydroazepino-[4,5-b]indoles by hydrogenolysis in the presence of a noble metal catalyst, preferably palaldium on a carrier. Representative compounds thus prepared include:

8-ethyl-1,2,3,4,5,6-hexahydroazepino[4,5-b]indole;
10-ethyl-1,2,3,4,5,6-hexahydroazepino[4,5-b]indole;
7-ethyl-1,2,3,4,5,6-hexahydroazepino[4,5-b]indole;
9-propyl-1,2,3,4,5,6-hexahydroazepino[4,5-b]indole;
7-propyl-1,2,3,4,5,6-hexahydroazepino[4,5-b]indole;
8-propyl-1,2,3,4,5,6-hexahydroazepino[4,5-b]indole;
10-propyl-1,2,3,4,5,6-hexahydroazepino[4,5-b]indole;
9-isopropyl-1,2,3,4,5,6-hexahydroazepino[4,5-b]indole;
7-isopropyl-1,2,3,4,5,6-hexahydroazepino[4,5-b]indole;
9-chloro-1,2,3,4,5,6-hexahydroazepino[4,5-b]indole;
7-bromo-1,2,3,4,5,6-hexahydroazepino[4,5-b]indole;
8-fluoro-1,2,3,4,5,6-hexahydroazepino[4,5-b]indole;
10-fluoro-1,2,3,4,5,6-hexahydroazepino[4,5-b]indole;
7-ethoxy-1,2,3,4,5,6-hexahydroazepino[4,5-b]indole;
8-ethoxy-1,2,3,4,5,6-hexahydroazepino[4,5-b]indole;
10-ethoxy-1,2,3,4,5,6-hexahydroazepino[4,5-b]indole;
9-isopropoxy-1,2,3,4,5,6-hexahydroazepino[4,5-b]indole;
8,9-dichloro-1,2,3,4,5,6-hexahydroazepino[4,5-b]indole;
9,10-dichloro-1,2,3,4,5,6-hexahydroazepino[4,5-b]indole;
7,8-difluoro-1,2,3,4,5,6-hexahydroazepino[4,5-b]indole;
7,8-dibromo-1,2,3,4,5,6-hexahydroazepino[4,5-b]indole;
8,9-dimethyl-1,2,3,4,5,6-hexahydroazepino[4,5-b]indole;
9,10-dimethyl-1,2,3,4,5,6-hexahydroazepino[4,5-b]indole;
7,8-dimethyl-1,2,3,4,5,6-hexahydroazepino[4,5-b]indole;
7,8-diethoxy-1,2,3,4,5,6-hexahydroazepino[4,5-b]indole;
7-ethoxy-8-fluoro-1,2,3,4,5,6-hexahydroazepino[4,5-b] indole;
7-bromo-9-propoxy-1,2,3,4,5,6-hexahydroazepino[4,5-b] indole;
7-methyl-9-chloro-1,2,3,4,5,6-hexahydroazepino[4,5-b] indole;

and the like.

EXAMPLE 44

*3-formyl-1,2,3,4,5,6-hexahydroazepino[4,5-b]indole*

A mixture of 9.45 ml. of acetic anhydride and 3.98 ml. of 98% formic acid was stirred and allowed to stand at 25° C. for 1 hour. The mixture was then cooled in an ice bath and treated with 5.58 g. (0.03 mole) of 1,2,3, 4,5,6- hexahydroazepino[4,5-b]indole. As this indole went into solution, a second precipitate formed. Then 25 ml. of ether was added to the resulting mixture which was allowed to stand in a nitrogen atmosphere for 18 hours and poured thereupon into water. The thus-obtained solid was collected by filtration, washed with water and dried in vacuo to give 6.27 g. of a crude product melting at 220–221.5° C. Recrystalilzation of this material from methanol-ethyl acetate yielded three crops: 4.24 g. having a melting point of 221–222.5° C.; 1.19 g. melting at 220.5–221.5° C. and 0.282 g. of melting point 219.5–221° C. of 3-formyl-1,2,3,4,5,6-hexahydroazepino[4,5-b] indole (a total yield of 89%). Recrystallization of this material from methylene chloride-methanol provided 3-formyl-1,2,3,4,5,6-hexahydroazepino[4,5-b]indole of melting point 221–222.5° C.

*Analysis.*—Calcd. for $C_{13}H_{14}N_2O$ (percent): C, 72.87; H, 6.59; N, 13.08. Found (percent): C, 72.90; H, 6.74; N, 12.84.

EXAMPLE 45

*3-acetyl-8-methoxy-1,2,3,4,5,6-hexahydro-azepino[4,5-b]indole*

A solution of 2 g. of 8-methoxy-1,2,3,4,5,6-hexahydroazepino[4,5-b]indole in 25 ml. of pyridine and 10 ml. of acetic anhydride was allowed to stand at room temperature for 20 hours in a nitrogen atmosphere. The reaction mixture was poured into water, the solids collected on a filter and recrystallized from methanol-ethyl acetate to give 3-acetyl-8-methoxy-1,2,3,4,5,6-hexahydroazepino-[4,5-b]indole.

EXAMPLE 46

*3-propionyl-9-fluoro-1,2,3,4,5,6-hexahydro-azepino[4,5-b]indole*

In the manner given in Example 45, a fluoro-1,2,3,4,5,6-hexahydroazepino[4,5-b]indole was reacted with propionic anhydride in pyridine to give 3-propionyl-9-fluoro-1,2,3,4,5,6-hexahydroazepino[4,5-b]indole.

EXAMPLE 47

*3-acetyl-7-methyl-1,2,3,4,5,6-hexahydro-azepino[4,5-b]indole*

In the manner given in Example 45, 7-methyl-1,2,3,4,5,6-hexahydroazepino[4,5-b]indole was reacted with acetic anhydride in pyridine to give 3-acetyl-7-methyl-1,2,3,4,5,6-hexahydroazepino[4,5-b]indole.

EXAMPLE 48

*3-propionyl-9-methyl-1,2,3,5,6-hexahydro-azepino[4,5-b]*

In the manner given in Example 45, 9-methyl-1,2,3,4,5,6-hexahydroazepino[4,5-b]indole was reacted with propionic anhydride in pyridine to give 3-propionyl-9-methyl-1,2,3,4,5,6-hexahydroazepino[4,5-b]indole.

EXAMPLE 49

*3-acetyl-9-methoxy-1,2,3,4,5,6-hexahydro-azepino[4,5-b]indole*

In the manner given in Example 45, 9-methoxy-1,2,3,4,5,6-hexahydroazepino[4,5-b]indole was reacted with acetic anhydride in pyridine to give 3-acetyl-9-methoxy-1,2,3,4,5,6-hexahydroazepino[4,5-b]indole.

EXAMPLE 50

*3-formyl-7-chloro-1,2,3,4,5,6-hexahydro-azepino[4,5-b]indole*

In the manner given in Example 44, 7-chloro-1,2,3,4,5,6-hexahydroazepino[4,5-b]indole was reacted with acetic anhydride and formic acid to give 3-formyl-7-chloro-1,2,3,4,5,6-hexahydroazepino[4,5-b]indole.

EXAMPLE 51

*3-acetyl-7,8-dibromo-1,2,3,4,5,6-hexahydro-azepino[4,5-b]indole*

In the manner given in Example 45, 7,8-dibromo-1,2,3,4,5,6-hexahydroazepino[4,5-b]indole was reacted with acetic anhydride in pyridine to give 3-acetyl-7,8-dibromo-1,2,3,4,5,6-hexahydroazepino[4,5-b]indole.

EXAMPLE 52

*3-acetyl-7-methyl-9-chloro-1,2,3,4,5,6-hexahydro-azepino[4,5-b]indole*

In the manner given in Example 45, 7-methyl-9-chloro-1,2,3,4,5,6 - hexahydroazepino[4,5-b]indole was reacted with acetic anhydride in pyridine to give 3-acetyl-7-methyl-9-chloro-1,2,3,4,5,6-hexahydroazepino[4,5-b]indole.

In the manner given in Examples 44, 45 and 46, other 3-acyl derivatives of the substituted 1,2,3,4,5,6-hexahydroazepino[4,5-b]indoles of Examples 32 through 43, including the compounds in the list following Example 43, can be prepared by reacting such compounds with a reagent selected from acetic anhydride, acetic anhydride and formic acid, propionic anhydride, or acetyl chloride, propionyl chloride, benzoyl chloride, or bromides thereof.

EXAMPLE 53

*3-methyl-1,2,3,4,5,6-hexahydroazepino[4,5-b]indole*

To a stirred suspension of 1 g. of lithium aluminum hydride in 100 ml. of ice-cold tetrahydrofuran was added 3-formyl-1,2,3,4,5,6-hexahydroazepino[4,5-b]indole (1 g.; 0.00467 mole). The mixture was refluxed for 18 hours in a nitrogen atmosphere, then cooled in an ice bath and treated successively with 1 ml. of water, 1 ml. of 15% aqueous sodium hydroxide solution and 3 ml. of water. The resulting mixture was stirred for 1 hour and filtered. Concentration of the filtrate under reduced pressure gave a solid which was recrystallized from ethyl acetate to yield 0.853 g. (91.3%) of 3-methyl-1,2,3,4,5,6-hexahydroazepino[4,5-b]indole of melting point 162–166° C. Recrystallization of this material from ethyl acetate gave 3-methyl - 1,2,3,4,5,6 - hexahydroazepino[4,5-b]indole of melting point 165–166.5° C.

*Analysis.*—Calcd. for $C_{13}H_{16}N_2$ (percent): C, 77.96; H, 8.05; N, 13.99. Found (percent): C, 77.69; H, 8.08; N, 13.72.

In the same manner given in Example 53, reduction of 3 - acetyl-8-methoxy-1,2,3,4,5,6-hexahydroazepino[4,5-b] indole with lithium aluminum hydride gave 3-ethyl-8-methoxy - 1,2,3,4,5,6-hexahydroazepino[4,5-b]indole; reduction of 3-propionyl-9-fluoro-1,2,3,4,5,6-hexahydroazepino[4,5-b]indole gave 3-propyl-9-fluoro-1,2,3,4,5,6-hexahydroazepino[4,5-b]indole; reduction of 3-acetyl-7-methyl-1,2,3,4,5,6-hexahydroazepino[4,5-b]indole gave 3-ethyl - 7 - methyl-1,2,3,4,5,6-hexahydroazepino[4,5-b]indole; reduction of 3-propionyl-9-methyl-1,2,3,4,5,6-hexahydroazepino[4,5-b]indole gave 3-propyl-9-methyl-1,2,3,4,5,6-hexahydroazepino[4,5-b]indole; reduction of 3-acetyl-9-methoxy-1,2,3,4,5,6-hexahydroazepino[4,5-b]indole gave 3-ethyl - 9 - methoxy-1,2,3,4,5,6-hexahydroazepino[4,5-b] indole; reduction of 3-formyl-7-chloro-1,2,3,4,5,6-hexahydroazepino[4,5-b]indole gave 3-methyl-7-chloro-1,2,3,4,5, 6-hexahydroazepino[4,5-b]indole; reduction of 3-acetyl-7,8 - dibromo - 1,2,3,4,5,6-hexahydroazepino[4,5-b]indole gave 3-ethyl - 7,8 - dibromo-1,2,3,4,5-hexahydroazepino [4,5-b]indole; and reduction of 3-acetyl-7-methyl-9-chloro-1,2,3,4,5,6-hexahydroazepino[4,5-b]indole gave 3-ethyl - 7 - methyl - 9 - chloro-1,2,3,4,5,6-hexahydroazepino-[4,5-b]indole.

In the same manner given in Example 53, other 3-acyl derivatives of substituted 1,2,3,4,5,6-hexahydrozaepino-[4,5-b]indoles as herein shown can be converted to the corresponding 3-alkyl substituted 1,2,3,4,5,6-hexahydroazepino[4,5-b]indoles.

EXAMPLE 54

*6-methyl-1,2,3,4,5,6-hexahydroazepino[4,5-b]indole and hydrochloride thereof*

To an ice-cold, stirred solution of 1,2,3,4,5,6-hexahydroazepino[4,5-b]indole (3.73 g.; 0.02 mole) in 200 ml. of dry dimethylformamide was added in a nitrogen atmosphere, 0.960 g. of a 55% suspension of sodium hydride in mineral oil (0.022 mole of sodium hydride). This mixture was allowed to warm to 25° C. and stand for 2 hours. It was then cooled in an ice bath and treated during 30 minutes with a solution of methyl iodide (1.37 ml.; 0.022 mole) in 25 ml. of ether. The resulting solution was allowed to stand for 18 hours at 25° C. It was then concentrated under reduced pressure to about 50 ml. and poured into water. The mixture was extracted four times with ether, the ether extracts combined, washed with brine, dried over anhydrous potassium carbonate and concentrated under reduced pressure to give 6-methyl-1,2,3,4,5, 6-hexahydroazepino[4,5-b]indole as a residue. This residue was redissolved in ethyl acetate and acidified with methanolic hydrogen chloride and the resulting hygroscopic salt was crystallized from methanol-ethyl acetate to give 3.19 g. (75.3%) of material which was again recrystallized from methanol-ethyl acetate to give 6-methyl-1,2,3,4,5,6 - hexahydroazepino[4,5-b]indole hydrochloride of a melting point of 214–215° C.

*Analysis.*—Calcd. for $C_{13}H_{17}N_2Cl$ (percent): C, 65.95; H, 7.24; N, 11.84; Cl, 14.98. Found (percent): C, 66.35; H, 6.99; N, 11.78; Cl, 14.90.

EXAMPLE 55

*6-ethyl-1,2,3,4,5,6-hexahydroazepino[4,5-b]indole hydrochloride*

A cold solution of 7.45 g. of 1,2,3,4,5,6-hexahydroazepino[4,5-b]indole in 400 ml. of dry dimethylformamide in a nitrogen atmosphere was treated with 1.92 g. of a 55% suspension of sodium hydride in mineral oil. The mixture was stirred at room temperature for 3 hours, then cooled and treated with a solution of 3.54 ml. of ethyl iodide in 50 ml. of ether. The addition took place over a period of 15 minutes. The mixture was then allowed to stir at room temperature for about 18 hours. The mixture was thereupon concentrated under reduced pressure to give a residue which was dissolved in 250 ml. of water. The aqueous mixture was extracted three times with ether and three times with methylene chloride. The two extracts were worked separately, that is, washed with brine, then water and finally dried over anhydrous potassium carbonate. Thereafter, the two extracts were combined and concentrated to give a residue which was suspended on 30 g. of silica gel and chromatographed over 450 g. of silica gel using 2% ethylamine-48% methanol-50% ethyl acetate for elution. Fractions of about 150 ml. were collected. The first band (A) consisted of fractions 6–9. The product was found in fractions 14–21 (band B). The B fractions were combined and concentrated under reduced pressure to give a residue which was dissolved in ethyl acetate, cooled and acidified with methanolic hydrogen chloride. The precipitate which resulted was collected by filtration, washed with ethyl acetate and dried in vacuo to yield 7.67 g. of material which was recrystallized from methanol and then three times from methanol-ethyl acetate to give 6-ethyl-1,2,3,4,5,6-hexahydroazepino[4,5-b]indole hydrochloride of melting point 253–254° C. (dec.).

*Analysis.*—Calcd. for $C_{14}H_{19}N_2Cl$ (percent): C, 67.05; H, 7.64; N, 11.17; Cl, 14.14. Found (percent): C, 67.10; H, 7.90; N, 11.47; Cl, 14.38.

EXAMPLE 56

*6 - methyl - 9-methoxy-1,2,3,4,5,6-hexahydroazepino[4,5-b]indole hydrochloride and 3,6-dimethyl-9-methoxy-1,2,3,4,5,6 - hexahydroazepino[4,5-b]indole hydrochloride*

In the manner shown in Example 55, 9-methoxy-1,2,3,4,5,6-hexahydroazepino[4,5-]indole was treated with sodium hydride and then with methyl iodide to give a mixture of amines. This mixture was separated by chromatography over silica gel using as eluant a mixture of 2% diethylamine-15% methanol-83% ethyl acetate. Fractions 14–24 contained 3,6-dimethyl-9-methoxy-1,2,3,4,5,6-hexahydroazepino[4,5-b]indole which was converted to its hydrochloride with methanolic hydrogen chloride. Crystallization of this salt from methanol gave 3,6-dimethyl - 9 - methoxy-1,2,3,4,5,6-hexahydroazepino[4,5-b]indole hydrochloride having a melting point of 270° C. (dec.).

*Analysis.*—Calcd. for $C_{15}H_{21}ClN_2O$ (percent): C, 64.16; H, 7.54; N, 9.98; Cl, 12.63. Found (percent): C, 64.20; H, 7.73; N, 9.82; Cl, 12.78.

Fractions 28–49 from the chromatographic column contained 6-methyl-9-methoxy-1,2,3,4,5,6-hexahydroazepino[4,5-b]indole which was converted to its hydrochloride with methanolic hydrogen chloride. Crystallization of this salt from methanol gave 6-methyl-9-methoxy-1,2,3,4,5,6-hexahydroazepino[4,5-b]indole hydrochloride having a melting point of 272° C. (dec.).

*Analysis.*—Calcd. for $C_{14}H_{19}ClN_2O$ (percent): C, 63.03; H, 7.18; N, 10.50; Cl, 13.29. Found (percent): C, 62.89; H, 7.25; N, 10.36; Cl, 13.25.

EXAMPLE 57

*6-benzyl-1,2,3,4,5,6-hexahydroazepino[4,5 - b]indole and hydrochloride thereof, and 3,6-dibenzyl-1,2,3,4,5,6-hexahydroazepino[4,5-b]indole*

In the manner given in Example 55, 5.59 g. of 1,2,3,4,5,6-hexahydroazepino[4,5-b]indole in 300 ml. of dimethylformamide was reacted with 1.44 g. of a 55% suspension of sodium hydride in mineral oil and, after standing for 3 hours and cooling, with 4.18 g. of benzyl chloride in 37 ml. of dry ether. The mixture was allowed to stir for 18 hours at room temperature, the solution was then concentrated under reduced pressure to give a residue which was dissolved in 300 ml. of water and extracted with methylene chloride. The methylene chloride extracts were washed with water, dried over potassium carbonate and concentrated under reduced pressure. The residue was redissolved in ethyl acetate. A small amount of material which crystallized was collected by filtration. The mother liquors were chromatographed over 450 g. of silica gel using a solvent system consisting of 2% diethylamine, 28% ethyl acetate and 70% cyclohexane. Fractions of 100 ml. were collected. Fractions 13–19 contained one compound which was found to be 3,6-dibenzyl-1,2,3,4,5,6-hexahydroazepino[4,5-b]indole of melting point 85.5–86.5° C.

*Analysis.*—Calcd. for $C_{26}H_{26}N_2$ (percent): C, 85.20; H, 7.15; N, 7.65. Found (percent): C, 84.80; H, 7.25; N, 7.74.

The column was then eluted with a mixture of 2% trimethylamine and 98% methanol. A methanolic solution of the product obtained in this manner was converted to its hydrochloride. Crystallization of this salt from methanol-ethyl acetate gave 6-benzyl-1,2,3,4,5,6-hexahydroazepino[4,5-b]indole hydrochloride having a melting point of 212–213° C.

*Analysis.*—Calcd. for $C_{19}H_{21}N_2Cl$ (percent): C, 72.95; H, 6.77; N, 8.96; Cl, 11.35. Found (percent): C, 72.51; H, 6.75; N, 9.21; Cl, 11.41.

EXAMPLE 58

*6 - propyl - 9 - fluoro-1,2,3,4,5,6-hexahydroazepino[4,5-b]indole and hydrochloride thereof*

In the manner given in Example 55, 9-fluoro-1,2,3,4,5,6-hexahydroazepino[4,5-b]indole was treated in sequence with sodium hydride and then propyl iodide to give 6-propyl - 9 - fluoro-1,2,3,4,5,6-hexahydroazepino[4,5-b]indole which was recovered from a methanolic hydrogen chloride solution as the hydrochloride.

EXAMPLE 59

*6-isopropyl-9-methyl-1,2,3,4,5,6-hexahydroazepino-[4,5-b]indole and hydrochloride thereof*

In the manner given in Example 55, 9-methyl-1,2,3,4,5,6-hexahydroazepino[4,5-b]indole in dimethylformamide was treated in sequence with sodium hydride and then with isopropyl iodide to give 6-isopropyl-9-methyl-1,2,3,4,5,6-hexahydroazepino[4,5-b]indole which was recovered as the hydrochloride.

EXAMPLE 60

*3-formyl-6-methyl-1,2,3,4,5,6-hexahydroazepino-[4,5-b]indole*

In the manner given in Example 44, 6-methyl-1,2,3,4,5,6-hexahydroazepino[4,5-b]indole was treated with acetic anhydride and formic acid to give 3-formyl-6-methyl-1,2,3,4,5,6 - hexahydroazepino[4,5-b]indole which after recrystallization from methylene chloride-methanol had a melting point of 125–128.5° C.

*Analysis.*—Calcd. for $C_{14}H_{16}ON_2$ (percent): C, 73.65; H, 7.06; N, 12.27. Found (percent): C, 73,57; H, 7.05; N, 12.55.

In the same manner, acylating 6-methyl-1,2,3,4,5,6-hexahydroazepino[4,5-b]indole with acetic or propionic anhydride yields the corresponding 3-acetyl- or 3-propionyl - 6 - methyl - 1,2,3,4,5,6-hexahydroazepino[4,5-b]indole.

EXAMPLE 61

*3,6-dimethyl-1,2,3.4,5,6-hexahydroazepino [4,5-b]indole hydrochloride*

To a cold suspension of 5 g. of lithium aluminum hydride in 100 ml. of tetrahydrofuran in a nitrogen atmosphere was added a solution of 5.07 g. of 3-formyl-6-methyl-1,2,3,4,5,6-hexahydroazepino[4,5-b]indole. The mixture was refluxed for 18 hours, then cooled in an ice bath and decomposed by adding in sequence 5 ml. of water, 5 ml. of 15% aqueous sodium hydroxide and 15 ml. of water. The mixture was now allowed to stir at room temperature for about 1 hour and was thereupon filtered, the precipitate washed with tetrahydrofuran and the washings and filtrate combined and concentrated under reduced pressure to give an oil. This oil was dissolved in ethyl acetate and acidified with methanolic hydrogen chloride to give a solid which was recovered by filtration to yield 3.77 g. of 3,6 - dimethyl - 1,2,3,4,5,6-hexahydroazepino [4,5-b]indole hydrochloride which after recrystallization from methanol-ethyl acetate had a melting point of 251–251.5° C.

*Analysis.*—Calcd. for $C_{14}H_{19}N_2Cl$ (percent): C, 67.05; H, 7.64; N, 1.17; Cl, 14.14. Found (percent): C, 67.18; H, 7.70; N, 11.37; Cl, 14.28.

EXAMPLE 62

*3-benzoyl-6-methyl-10-methoxy-1,2,3,4,5,6-hexahydroazepino[4,5-b]indole*

A solution of 3-benzoyl-10-methoxy-1,2,3,4,5,6-hexahydroazepino[4,5-b]indole in dimethylformamide was treated with sodium hydride and thereupon with methyl iodide to give 3-benzoyl-6-methyl-10-methoxy-1,2,3,4,5,6-hexahydroazepino[4,5-b]indole which after several recrystallizations from methanol-methylene chloride had a melting point of 187.5–188° C.

*Analysis.*—Calcd. for $C_{21}H_{22}N_2O_2$ (percent): C, 75.42; H, 6.63; N, 8.38. Found (percent): C, 75.36; H, 6.80; N, 8.36.

EXAMPLE 63

*3-benzyl-6-methyl-10-methoxy-1,2,3,4,5,6-hexahydroazepino[4,5-b]indole and hydrochloride thereof*

Likewise as in Example 21, 3-benzoyl-6-methyl-10-methoxy-1,2,3,4,5,6-hexahydroazepino[4,5-b]indole was reduced with a cold solution of lithium aluminum hydride in tetrahydrofuran, the solution was decomposed with sodium hydroxide and water and the product isolated in conventional manner to give after recrystallization from ethyl acetate-Skellysolve B hexanes a mixture of 3-benzyl-6-methyl - 10 - methoxy - 1,2,3,4,5,6 - hexahydroazepino [4,5-b]indole and 6-methyl-10-methoxy-1,2,3,4,5,6-hexahydroazepino[4,5-b]indole. Pure 3-benzyl - 6 - methyl-10-methoxy - 1,2,3,4,5,6-hexahydroazepino[4,5-b]indole was obtained by chromatographing this mixture on silica gel with 2% diethylamine-15% methanol-83% ethyl acetate. The product thus obtained was converted to its hydrochloride with methanolic hydrogen chloride and crystallized from methanol-ethyl acetate to give 3-benzyl-6-methyl - 10 - methoxy-1,2,3,4,5,6-hexahydroazepino[4,5-b]indole hydrochloride of melting point 246–247.5° C.

*Analysis.*—Calcd. for $C_{21}H_{25}N_2OCl$ (percent): C, 70.67; H, 7.06; N, 7.85; Cl, 9.94. Found (percent): C, 70.49; H, 7.45; N, 7.78; Cl, 10.03.

EXAMPLE 64

*6-methyl-10-methoxy-1,2,3,4,5,6-hexahydroazepino[4,5-b]indole hydrochloride*

In the manner given in Example 32, 3-benzyl-6-methyl-10-methoxy - 1,2,3,4,5,6 - hexahydroazepino[4,5-b]indole hydrochloride was hydrogenolyzed with 10% palladium-on-carbon catalyst at 47 p.s.i. for a duration of 4 hours. The product was several times recrystallized from methanol to give 6-methyl-10-methoxy-1,2,3,4,5,6-hexahydroazepino[4,5-b]indole hydrochloride of melting point 276.5–278° C.

*Analysis.*—Calcd. for $C_{14}H_{19}N_2OCl$ (percent): C, 63.03; H, 7.18; N, 10.50; Cl, 13.29. Found (percent): C, 62.93; H, 7.36; N, 10.52; Cl, 13.35.

EXAMPLE 65

*6-methyl-1,2,3,4,5,6-hexahydroazepino [4,5-b]indole hydrochloride*

(A) 3-benzoyl-6-methyl-1,2,3,4,5,6-hexahydroazepino[4,5-b]indole

To a stirred solution of 3-benzoyl-1,2,3,4,5,6-hexahydroazepino[4,5-b]indole (177.0 g.) in 2 gallons of dry dimethylformamide in a nitrogen atmosphere was added 28.2 g. of a 57.1% suspension of sodium hydride in mineral oil. The mixture was stirred for 2 hours at room temperature and then cooled in an ice bath. To the reaction mixture was then added dropwise over 20 minutes 41.8 ml. of methyl iodide. The resulting mixture was allowed to stand at room temperature for 18 hours. The dimethylformamide was then removed with the aid of a rotating evaporator at 7 mm. pressure at a temperature between 55–60° C. The residue was suspended in 3 l. of water and extracted with methylene chloride. The extracts were washed with water, dried over anhydrous potassium carbonate and concentrated under reduced pressure to give an oil. This oil was dissolved in 700 ml. of benzene and the resulting solution was concentrated to dryness to give an oily residue 3-benzoyl-6-methyl-1,2,3,4,5,6-hexahydroazepino[4,5-b]indole. This residual oil was used without purification for the preparation of 3-benzyl-6-methyl-1,2,3,4,5,6-hexahydroazepino[4,5-b]indole.

(B) 3-benzyl-6-methyl-1,2,3,4,5,6-hexahydroazepino[4,5-b]indole

A solution of the above crude 3-benzoyl-6-methyl-1,2,3,4,5,6-hexahydroazepino[4,5-b]indole in 1 l. of tetrahydrofuran was added slowly under nitrogen to an ice-cold, stirred suspension of 145 g. of lithium aluminum hydride in 7 l. of tetrahydrofuran. The resulting mixture was warmed slowly to the reflux temperature and refluxed for 18 hours. It was then cooled in an ice bath and treated successively with water (145 ml. dropwise), 145 ml. of 15% aqueous sodium hydroxide and 435 ml. of water. This mixture was stirred for about 30 minutes and filtered. The solid was washed well with tetrahydrofuran and the combined original filtrate and washings were concentrated under reduced pressure. The residual oil was dissolved in 1 l. of benzene and this solution was concentrated to dryness under reduced pressure to give 3-benzyl-6-methyl-1,2,3,4,5,6-hexahydroazepino[4,5-b]indole.

(C) 6-methyl-1,2,3,4,5,6-hexahydroazepino[4,5-b]indole hydrochloride

The above 3-benzyl-6-methyl-1,2,3,4,5,6-hexahydroazepino[4,5-b]indole in 1.5 l. of 95% ethanol, 50 ml. of glacial acetic acid and 20 g. of 10% palladium-on-carbon catalyst was hydrogenolyzed in a Parr apparatus for 1.5 hours. The catalyst was then removed by vacuum filtration through Celite (diatomaceous earth) and the filtrate was concentrated under reduced pressure. A solution of the residue in water was washed with ether, cooled in an ice bath and made alkaline with 50% aqueous sodium hydroxide. This mixture was extracted three times with chloroform, the coloroform extracts were combined, washed with water, dried over anhydrous potassium carbonate and concentrated under reduced pressure to give a residue. The residue was dissolved in methanol, the solution was cooled in an ice bath and acidified with methanolic hydrogen chloride. Crystallization of this salt from methanol-ethyl acetate gave three crops of 6-methyl-1,2,3, 4,5,6-hexahydroazepino[4,5-b]indole hydrochloride; 68.4 g. of melting point 214–216° C.; 31.2 g. of melting point 216° C.; and 11.1 g. of melting point 214–215.5° C. The overall yield was 76.8%. This compound was identical with the 6-methyl-1,2,3,4,5,6-hexahydroazepeino[4,5-b]indole hydrochloride prepared in Example 54.

In the manner shown in Example 65, Part A, 3-acyl substituted 1,2,3,4,5,6 - hexahydroazepino[4,5-b]indoles (for example, those of Examples 45–52) can be alkylated by treating these compounds in dimethyl- or diethylformamide in the presence of sodium hydride with methyl, ethyl, propyl or isopropyl iodides or bromides. Representative compounds thus obtained include:

3-propionyl-6-methyl-9-fluoro-1,2,3,4,5,6-hexahydroazepino[4,5-b]indole;
3-propionyl-6-ethyl-9-fluoro-1,2,3,4,5,6-hexahydroazepino[4,5-b]indole;
3-acetyl-6-propyl-7-methyl-1,2,3,4,5,6-hexahydroazepino-[4,5-b]indole;
3-acetyl-6-isopropyl-7-methyl-1,2,3,4,5,6-hexahydroazepino[4,5-b]indole;
3-propionyl-6,9-dimethyl-1,2,3,4,5,6-hexahydroazepino-[4,5-b]indole;
3-propionyl-6-ethyl-9-methyl-1,2,3,4,5,6-hexahydroazepino[4,5-b]indole;
3-acetyl-6-ethyl-9-methoxy-1,2,3,4,5,6-hexahydroazepino-[4,5-b]indole;
3-acetyl-isopropyl-9-methoxy-1,2,3,4,5,6-hexahydroazepino[4,5-b]indole;
3-formyl-6-methyl-7-chloro-1,2,3,4,5,6-hexahydroazepino-[4,5-b]indole;
3-formyl-6-propyl-7-chloro-1,2,3,4,5,6-hexahydroazepino[4,5-b]indole;
3-acetyl-6-methyl-7,8-dibromo-1,2,3,4,5,6-hexahydroazepino[4,5-b]indole
3-acetyl-6,7-dimethyl-9-chloro-1,2,3,4,5,6-hexahydroazepino[4,5-b]indole;
3-acetyl-6-ethyl-7-methyl-9-chloro-1,2,3,4,5,6-hexahydroazepino[4,5-b]indole;
3-formyl-6-isopropyl-7-chloro-1,2,3,4,5,6-hexahydroazepino[4,5-b]indole;

and the like.

In the manner given in Example 65, Part B, the thus-obtained 3-acyl-6-alkyl substituted 1,2,3,4,5,6-hexahydroazepino[4,5-b]indoles can be reduced with lithium aluminum hydride, usually in tetrahydrofuran, to give the corresponding 3,6-dialkylsubstituted 1,2,3,4,5,6-hexahydroazepino[4,5-b]indoles such as, for example:

3-propyl-6-methyl-9-fluoro-1,2,3,4,5,6-hexahydroazepino-[4,5-b]indole;
3-propyl-6-ethyl-9-fluoro-1,2,3,4,5,6-hexahydroazepino-[4,5-b]indole;
3-ethyl-6-propyl-7-methyl-1,2,3,4,5,6-hexahydroazepino-[4,5-b]indole;
3-ethyl-6-isopropyl-7-methyl-1,2,3,4,5,6-hexahydroazepino[4,5-b]indole;
3-propyl-6,9-dimethyl-1,2,3,4,5,6-hexahydroazepino-[4,5-b]indole;
3-propyl-6-ethyl-9-methyl-1,2,3,4,5,6-hexahydroazepino-[4,5-b]indole;
3,6-diethyl-9-methoxy-1,2,3,4,5,6-hexahydroazepino-[4,5-b]indole;
3-ethyl-6-isopropyl-9-methoxy-1,2,3,4,5,6-hexahydroazepino[4,5-b]indole;
3,6-dimethyl-7-chloro-1,2,3,4,5,6-hexahydroazepino-[4,5-b]indole;
3-methyl-6-propyl-7-chloro-1,2,3,4,5,6-hexahydroazepino[4,5-b]indole;
3-ethyl-6-methyl-7,8-dibromo-1,2,3,4,5,6-hexahydroazepino[4,5-b]indole;
3-ethyl-6,7-dimethyl-9-chloro-1,2,3,4,5,6-hexahydroazepino[4,5-b]indole;
3,6-diethyl-7-methyl-9-chloro-1,2,3,4,5,6-hexahydroazepino[4,5-b]indole;
3-methyl-6-isopropyl-7-chloro-1,2,3,4,5,6-hexahydroazepino[4,5-b]indole;

and the like.

What is claimed is:

1. A 6 - alkyl - 1,2,3,4,5,6 - hexahydroazepino[4,5-b]indole of the formula:

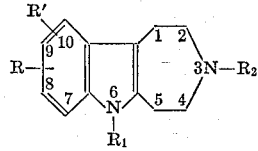

wherein R and R' are selected from the group consisting of hydrogen, alkoxy and alkyl containing from 1 to 3 carbon atoms, inclusive, and halogen; wherein $R_1$ is alkyl containing from 1 to 3 carbon atoms, inclusive; and wherein $R_2$ is selected from the group consisting of hydrogen, methyl, ethyl, propyl, alkanoyl groups containing 1 to 3 carbon atoms, inclusive, benzyl and benzoyl, and the pharmaceutically acceptable acid addition salts of those compounds wherein $>N—R_2$ is an amino moiety.

2. A compound according to claim 1, wherein R, R' and $R_2$ are hydrogen and $R_1$ is methyl, so that the compound is 6-methyl-1,2,3,4,5,6-hexahydroazepino[4,5-b]indole.

3. The hydrochloride of the compound of claim 2.

4. A compound according to claim 1, wherein R, R' and $R_2$ are hydrogen, $R_1$ is ethyl, as hydrochloride, so that the compound is 6-ethyl-1,2,3,4,5,6-hexahydroazepino-[4,5-b]indole hydrochloride.

5. A compound according to claim 1, wherein R and $R_2$ are hydrogen, R' is 9-methoxy and $R_1$ is methyl, as hydrochloride, so that the compound is 6-methyl-9-methoxy - 1,2,3,4,5,6 - hexahydroazepino[4,5-b]indole hydrochloride.

6. A compound according to claim 1, wherein R and R' are hydrogen, $R_1$ is methyl and $R_2$ is formyl, so that the compound is 3-formyl-6-methyl-1,2,3,4,5,6-hexahydroazepino[4,5-b]indole.

7. A compound according to claim 1, wherein R and R' are hydrogen and $R_1$ and $R_2$ are methyl, so that the compound is 3,6-dimethyl-1,2,3,4,5,6-hexahydroazepino [4,5-b]indole.

8. A compound according to claim 1, wherein R is hydrogen, R' is 10-methoxy, $R_1$ is methyl and $R_2$ is benzoyl, so that the compound is 3-benzoyl-6-methyl-10-methoxy-1,2,3,4,5,6-hexahydroazepino[4,5-b]indole.

9. A compound according to claim 1, wherein R is hydrogen, R' is 10-methoxy, $R_1$ is methyl and $R_2$ is benzyl, so that the compound is 3-benzyl-6-methyl-10-methoxy-1,2,3,4,5,6-hexahydroazepino[4,5-b]indole.

References Cited
UNITED STATES PATENTS 3,525,750    8/1970    Renner _____ 260—326.5

ALEX MAZEL, Primary Examiner

J. A. NARCAVAGE, Assistant Examiner

U.S. Cl. X.R.

71—95; 252—401; 260—239 B, 326.5 B, 326.9

UNITED STATES PATENT OFFICE
CERTIFICATE OF CORRECTION

Patent No. 3,652,588          Dated   March 28, 1972

Inventor(s)  Jackson B. Hester, Jr.

It is certified that error appears in the above-identified patent and that said Letters Patent are hereby corrected as shown below:

Column 4, line 41, for "transquilizing" read -- tranquilizing --; line 65, for "VI" read -- XI --. Column 7, line 17, for "50 mg." read -- 250 mg. --; line 44, for "C, 71,86;" read -- C, 71.86; --. Column 11, line 6, for "[3,4-b]" read -- [4,5-b] --: line 15, for "g. of" read -- g. --. Column 12, line 27, for "chloridemethanol" read -- chloride-methanol --. Column 13, line 46, for "hexahydroazepin" read -- hexahydroazepino --. Column 18, lines 19-20, for "hexahydropino" read -- hexahydroazepino --; line 26, for "276.5 C." read -- 276.5° C. --; line 67, for "recrystallized" read -- crystallized --. Column 19, line 22, for "benzyl-methyl" read -- benzyl-7-methyl --. Column 20, line 63, for "Recrystalilzation" read -- Recrystallization --. Column 21, line 16, for "a fluoro" read -- 9-fluoro --; line 31, for "1,2,3,5,6-" read -- 1,2,3,4,5,6- --. Column 25, line 29, for "N, 1.17;" read -- N, 11.17; --.

Signed and sealed this 24th day of October 1972.

(SEAL)
Attest:

EDWARD M. FLETCHER, JR.                ROBERT GOTTSCHALK
Attesting Officer                      Commissioner of Patents